US006957398B1

(12) United States Patent  (10) Patent No.: US 6,957,398 B1
Nayeri  (45) Date of Patent: Oct. 18, 2005

(54) COLLABORATIVE SCREENSAVER

(76) Inventor: Farshad Nayeri, 7 Audubon La., Carlisle, MA (US) 01741

( * ) Notice: Subject to any disclaimer, the term of this patent is extended or adjusted under 35 U.S.C. 154(b) by 457 days.

(21) Appl. No.: 09/741,800

(22) Filed: Dec. 22, 2000

Related U.S. Application Data

(60) Provisional application No. 60/171,475, filed on Dec. 22, 1999.

(51) Int. Cl.$^7$ ............................................. G06F 15/00
(52) U.S. Cl. ...................................... 715/867; 715/759
(58) Field of Search ............................... 715/867, 751, 715/753, 759, 752, 754, 757, 745, 811, 789; 709/204, 205, 100, 230; 345/867, 744–747, 866, 749, 811, 703–712; 710/1; 713/100

(56) References Cited

U.S. PATENT DOCUMENTS

| | | | |
|---|---|---|---|
| 4,796,945 A | | 1/1989 | Tarabella |
| 5,572,643 A | | 11/1996 | Judson |
| 5,673,430 A | | 9/1997 | Story |
| 5,737,619 A | | 4/1998 | Judson |
| 5,740,549 A | | 4/1998 | Reilly et al. |
| 5,748,190 A | * | 5/1998 | Kjorsvik ..................... 345/867 |
| 5,819,284 A | * | 10/1998 | Farber et al. ............... 709/203 |
| 5,821,924 A | | 10/1998 | Kikinis et al. |
| 5,832,223 A | | 11/1998 | Hara et al. |
| 5,848,396 A | | 12/1998 | Gerace |
| 5,850,220 A | * | 12/1998 | Motai ......................... 345/867 |
| 5,935,210 A | * | 8/1999 | Stark ........................... 709/224 |
| 6,084,583 A | * | 7/2000 | Gerszberg et al. .......... 345/867 |
| 6,256,008 B1 | * | 7/2001 | Sparks et al. ............... 345/618 |
| 6,288,715 B1 | * | 9/2001 | Bain et al. .................. 345/211 |
| 6,317,789 B1 | * | 11/2001 | Rakavy et al. .............. 709/224 |
| 6,384,853 B1 | * | 5/2002 | Shaffer et al. .............. 345/867 |
| 6,505,233 B1 | * | 1/2003 | Hanson et al. .............. 709/204 |
| 6,507,351 B1 | * | 1/2003 | Bixler ......................... 345/810 |
| 6,507,865 B1 | * | 1/2003 | Hanson et al. .............. 709/206 |
| 6,578,078 B1 | * | 6/2003 | Smith et al. ................ 709/224 |
| 6,691,153 B1 | * | 2/2004 | Hanson et al. .............. 709/204 |

OTHER PUBLICATIONS

Amy Cortese, "After Dark Adds News to its Views", Business Week, Oct. 7, 1996.
"Art Suffers with death of ghosts in Monitors; Images: No longer needed for protection, screen savers linger as vision of creativity", Baltimore Sun, Sep. 6, 1999.
Alex Grove, "Danger Flying Toasters", Red Herring, Dec. 1, 1996.
J.C. Herz, "Flying Toasters that you can play with", New York Times, Apr. 29, 1999.
"Going Bezerk: The Berkeley Way"; Digital Kids, Feb. 1, 1998.
Andrew Brandt, "Play With your Screen Saver", PC World–News Supplement, Dec. 30, 1998.
"Active Screen Saver Dev. Kit 2.0", Automated Office Systems, Apr. 1, 1999.
Media Builder.

(Continued)

Primary Examiner—Steven Sax

(57) ABSTRACT

Audiovisual images from independent providers on the Internet are exhibited as part of an updating, shared, collaboratively-produced multimedia exhibition system. Each individual user can choose to include or exclude certain content by personalizing his collection of images, by optionally rating each picture. Groups of users can share their collections amongst themselves. Content providers on the internet can allow visitors to include their audivisual information by adding a single button. The server keeps profile information for each user and for the groups to which the user belongs.

24 Claims, 14 Drawing Sheets

OTHER PUBLICATIONS

John Goddard, "Slick Annimation for Web or Screen: Net-Animator creates lively moving graphics for Web or screen saver", PC World, Mar. 29, 1999.
Tom Spring, "Beatnik audio plug–in adds sounds to web sites, but is anybody listening?" PC World Sep. 3, 1999.
Jamie Zuwinski, "Web College", http://www.jzw.org/webcollege/, Oct. 5, 1999.
Matthew Nelson, "Trojans Arriving by Spam", Info World Electric, May 28, 1999.
Jamie Zuwinski, "A Screensaver Manifesto", http://www.jwz.org/gruntle/savers.html, Jan. 1, 1996.
Dyrli et al. "The multimedia makeover of the World Wide Web", Technology & Learning, V18 N2, Sep. 1, 1997.
Chervoka et al., "The Alley Mobilizes To Take On Point-Cast", New York Times, Sep. 30, 1996.
Janice Maloney, "Dave Dorman: The Push PointCast Needs to Go Public", Weekly Standard, May 8, 1998.
Matt Richtel, "Ideal Buys PointCast", New York Times, May 11, 1999.
"PointCast: It coulda Been a Contender", Weekly Standard, Apr. 24, 1999.
Alex Glove, "More Than A Metaphor? PointCast is establishing a new way to deliver content to the desktop", Red Herring, Jun. 1, 1996.
Seth Schiesel, "News Corp. Seeks to Buy Pointcast, but Price is Snag", New York Times, Mar. 19, 1997.
Himelstein et al., "PointCast: The Rise and Fall of an Internet Star", Business Week, Apr. 26, 1996.
Laura Rich, "Benchmark Capital's Slam Dunk Is Air Ball for Hummer Wiblad", Weekly Standard, 3/10, 1999.
Ashely Dunn, "Technologies that push choas onto your laptop", New York Times, Jan. 1, 1997.
Laurence Zuckerman, "Convention Highlights 'Push' Software for Web Browsers", New York Times, Dec. 9, 1996.
Seth Schiesel, "Push Technology: Diggin In Despite Criticism", New York Times, Jun. 2, 1997.
Matt Richtel, "After Falling Outof Favor, 'push' Reinvents Itself", New York Times, May 20, 1998.
"When push come to News", American Jornalism Review, Jun. 20, 1999.
Sreenath Sreenivasan, "The World Wide Wait: Don't get mad, get off", New York Times, Sep. 30, 1996.

* cited by examiner

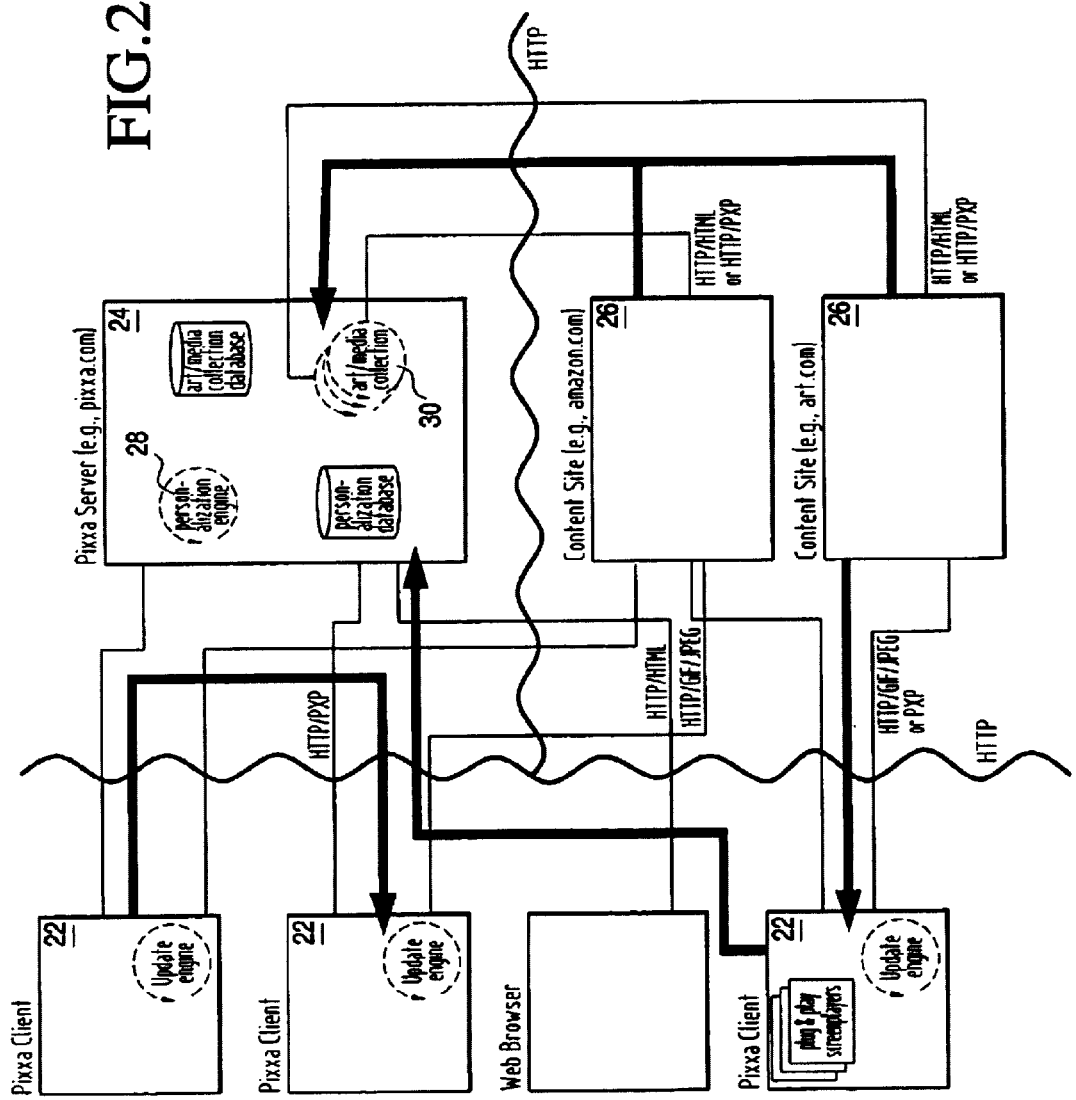

COLLABORATIVE SCREENSAVER

CROSS-REFERENCE TO RELATED APPLICATION

This application claims the benefit of the earlier filing date of provisional application No. 60/171,475, filed Dec. 22, 1999, which is hereby incorporated herein by reference in its entirety.

REFERENCE TO APPENDIX

This application includes text Appendices A and B filed herewith, which are hereby incorporated herein by reference in their entirety.

TECHNICAL FIELD

This invention relates to personalized screensaver programs, and more particularly to enabling a user to construct personalized combinations of images or other web page content from Internet resources.

BACKGROUND

A user of an online computer service can perform tasks via the Internet such as communicating with other computer users, accessing various computer resources, and viewing, creating, or otherwise manipulating electronic content—that is, any combination of text, images, movies, music or other sound, animations, 3D virtual worlds, and links to other objects. A typical method of performing such tasks is to specify a network address, or Uniform Resource Locator (URL), at which a desired document resides. URLs are defined in Internet standard RFC 1738 to include an indication of the protocol to be used and the location of a resource on a web server. Any part of a web page can be retrieved independently by an Internet browser, or any program that specifies the URL. In response, an Internet browser contacts the corresponding server hosting the requested web page, retrieves the one or more files that make up the web page, and then displays the web page in a window on the user's computer screen.

Certain screensaver programs display a sequence of images and/or other content on a computer screen. A personalized screensaver program displays content selected by a user of the computer, which content may have been obtained by the user from web pages.

SUMMARY

According to various aspects of the invention audiovisual images from independent providers on the Internet are exhibited as part of an updating, shared, collaboratively-produced multimedia exhibition system. Each individual user can choose to include or exclude certain content by personalizing his collection of images, by optionally rating each picture. Groups of users can share their collections amongst themselves. Content providers on the internet can allow visitors to include their audivisual information by adding a single button. The server keeps profile information for each user and for the groups to which the user belongs.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a diagram that illustrates the Pixxa system architecture.

Like reference symbols in the various drawings indicate like elements.

DETAILED DESCRIPTION

Pixxa is a "collaborative screensaver," constructed by groups of users on topics of their choosing from images (or other multimedia content) on the web. Individual users assemble Pixxa collections by specifying search terms, then tailor and refine them by accepting or rejecting the images that result, or by including images from other individuals in their collections. Since the number of images available on the web is huge, the user is not limited to a particular type of picture. His screensaver can be as broad or as specific as he chooses, and he will be able to change it at any time.

A key aspect of Pixxa is that it is very easy to share the resulting collection of images with other users. Thus, people who have similar interests will be able to receive the screensaver from a friend and further customize it, if they wish. The resulting exhibition of pictures, sounds, animations and other audiovisual information is produced by a "community of users," not necessarily by any individual user.

In addition to the properties important to the individual user, Pixxa has viral properties. These viral properties of Pixxa allow users to easily share images and collaborate in the development of highly optimized screensavers. In particular, with one click, a user can send a link to a friend to a customized screensaver. The friend can download the screensaver or add it to the pictures he already has.

Since Pixxa constructs a screensaver based entirely on the desires of the user (and others members of the groups to which the user belongs), the results will say a great deal about the users' and groups' likes and dislikes. This information will be useful to suppliers of products and services, whose offerings can likewise be targeted to specific potential customers, in much the same way as is now done with books and music.

Pixxa is designed to augment the World Wide Web as we know it. Whereas the Web was designed to handle static, text-based, single-content media, Pixxa is designed to excel at dynamic, shared, non-textual, multi-content media. Pixxa is dynamic in that it deals with updates to the set of media items in a collection readily and efficiently. Pixxa is shared in that it embellishes the shared aspects of the web by allowing users to share references to audiovisual contents (a Pixxa screensaver collection can be produced by groups of users). Pixxa is non-textual in that it is designed to deal with visual or aural information; for example, it can display thumbnails in "small multiple" displays on the screen (this is not to say that it does not also display text). Pixxa is multi-content in that it can deal with sets of media items instead of the single-page model of the web (it can be much easier to scan through a collection of Ralph Lauren benches using Pixxa than using the web).

Figure 1:
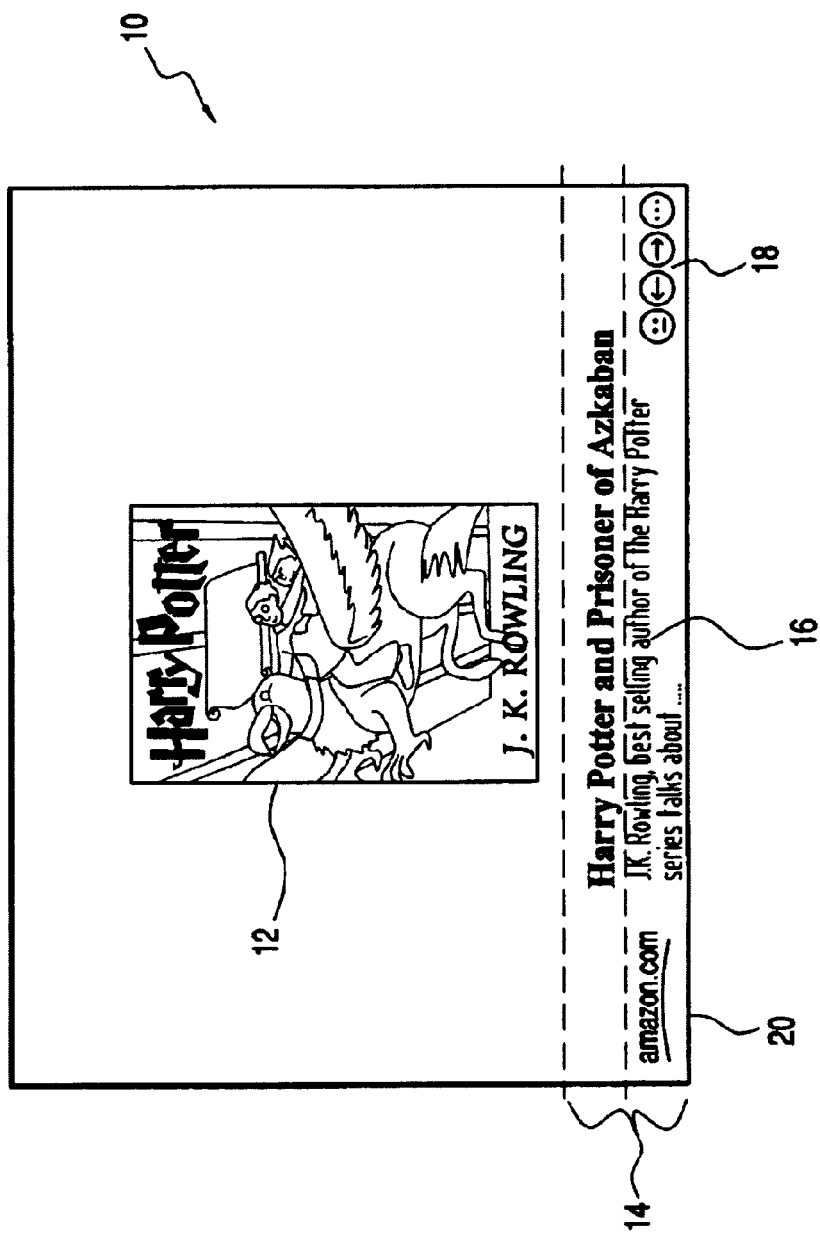
FIG. 1 is an illustration of the Pixxa screen layout.

Referring to FIG. 1, a typical Pixxa screensaver 10 consists of two parts: the "screenplayer" 12, which displays one or more images selected by the user; and the "console area" 14, which contains information 16 about the displayed image, the Pixxa control buttons 18, which allow the user to customize the screen, and a provider's logo 20, which is a link to a web browser that will open the provider's main page. Different versions of Pixxa can have different screen arrangements; for example, certain versions can display multiple screenplays at the same time.

The Pixxa architecture is illustrated in FIG. 2. A Pixxa system has three types of participants: clients 22, server 24, and content providers 26. The participants communicate mostly using standard Internet protocols. To augment the functionality of the web we have had to also design a new protocol specifically for communicating Pixxa personalization preferences. The personalization protocol is called PXP for Pixxa eXchange Protocol (or more generally Personalization eXchange Protocol).

Client 22 arranges the display of interesting media items (such as pictures). The client is responsible for deciding how to display the pictures and deciding how to time the pictures.

Server 24 provides just enough information to clients 22 so that they can operate. Server 24 keeps track of user's media items, the user's likes and dislikes, and whether images have become unavailable.

Content Provider 26 is a site with interesting media content, e.g., pictures, and textual content describing the media.

The role of server 24 is to provide client 22 with enough information so that it can display multimedia information (such as images) as part of something such as a continuous-running slide show.

The client and server (and the PXP protocol) are designed for coarse-grained communication. After a single contact with the server, the client can operate continuously without requiring further updates. Of course, the client's information about its collections may not stay up-to-date, but it will work.

It is important to note that Pixxa enables client 22 to only receive "meta-information" about audivisual information from the server. The client directly accesses the content provider in order to get the latest content. The role of server 24 then is to make sure that client 22 has enough meta-information so that it can retrieve and place the audiovisual information properly without requiring any modification to the provider's system (that is, in order for a provider to adopt Pixxa, the provider doesn't have to change its system at all or generate PXP files).

Pixxa uses the following Protocols: transport—HTTP; content—HTML/GIF/JPEG and potentially other media content, e.g., QuickTime, Real Audio, Windows Media Format, MP3; personalization/Sharing—PXP, a protocol designed specifically for Pixxa (see the PXP specification below for further information).

Pixxa is a collaborative system, which means that work gets done because users of the system build on top of work of other users. Each user is associated with one or more collections of media items. An online photo album is one incarnation of a collection. A song library in MP3 is another. Users can share collections, so when one changes the collection, the other sees the differences.

The system is designed to take full advantage of this generalization. Pixxa makes no assumption about media types, and the protocol is designed so that multiple clients with differing functionality can be built, similar to the way web browsers have evolved. Groups can be comprised of real members (i.e., people) or agents (i.e., computer programs) that add new collections. See also the system architectural diagram shown in FIG. 2.

The Pixxa client 22 starts out as a screensaver, but it can morph itself to a "sidebar" or side window, or a small stamp-sized window after certain interactions with the user. This allows Pixxa to be present at all times for the user to interact. The Pixxa client allows for display of multimedia information.

The client 22 will poll the server 24 once in a while for downloading new match information as well as uploading individual preference information to the server (so that it can be combined with other users' preferences). The server doesn't send down images; the client will download it in the background to accommodate slow modem lines.

Pixxa's implementation is not limited to a single platform. Rather, Pixxa can have multiple client implementations. Here is a roadmap for Pixxa clients:

v3 (codename pepperoni, in Macromedia Director)
v4 (codename d'lite, in C)
v6 (codename plain, for vanilla web browsers)
v7 (codename french bread, for WebTV)
v8 (codename anchovy, for Linux)
v9 (codename to go, for mobile devices).

The server also allows multiple clients to share collections, providing a single user identity across multiple locations.

The server 24 consists of two parts: the personalization sharing engine 28; and a set of art collectors 30.

The personalization sharing engine 28 keeps track of a user's collections, what the user likes, and how items in the collections are supposed to be sequenced on the screen. The users can share their personalizations with any other users.

The art collector 30 scans content provider web sites and keeps track of the information it finds about various media items on content providers. Each art collector is customized to work well in the context of a particular content-provider. There is also a generic collector that works with any web site (which works in less-optimized fashion or produces lower-quality collections because it has less context information).

The content providers 26 don't have to directly participate using the PXP. Pixxa server 24 can scan web content on content provider's web sites, and create PXP messages to its clients 22 for the proper media items. For example, Pixxa can scan Amazon.com's CD covers for R.E.M. and present them as a collection to the user. Once a single PXP message covering an image is received by a client, the client will download the image directly from the content provider 26. Each media item is associated with the page it came from (as well as other information, such as thumbnails). It is possible for Pixxa, in this model, to act like an "associates program on steroids" as it is generating thousands or millions of links into the content provider.

A Pixxa-friendly provider can generate PXP messages directly to be used by the client. This is useful for constantly updating collections so that the burden is removed from Pixxa itself.

Figure 3A:
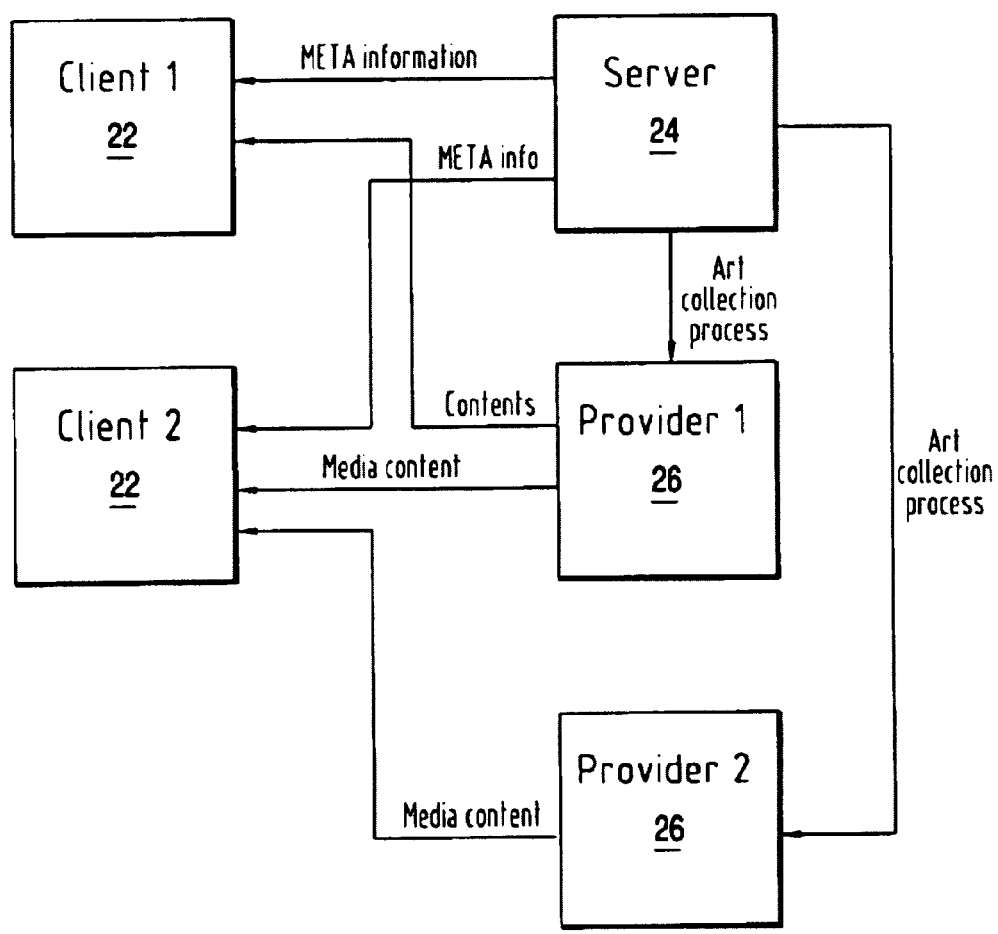
FIG. 3A is a flowchart that illustrates the relationship between the client, the server, and the content provider.
Figure 3B:
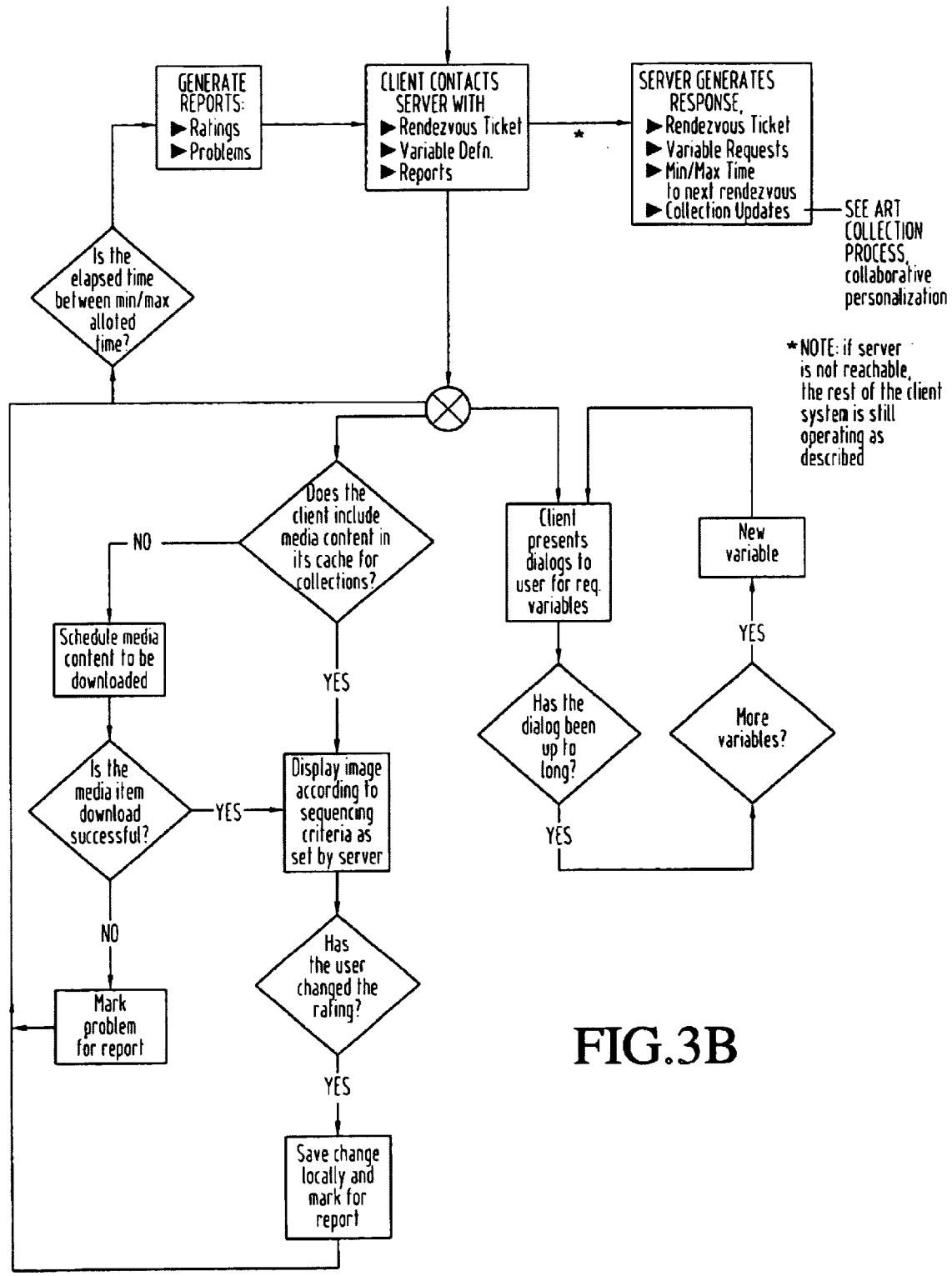
FIG. 3B is a flowchart that illustrates the interaction between the client and the server.

Referring to FIG. 3A, the relationship between the client, the server, and the content provider is illustrated. Referring to FIG. 3B, the interaction between the client and the server is shown.

Pixxa system design was based on the following goals:

Be easy to reimplement quickly and efficiently using primitive underlying technologies:
  use text with XML encoding;
  use standard transport and naming (TCP/IP, HTTP, URL);
  do not use any fancy communication or RPC systems;
  probably cannot depend on HTTP cookies for managing handles because many client interfaces do not support them well.

Use the transport in an efficient and scalable form:
  protocol may be used over low-bandwidth, high-latency modem lines;
  there should be a few "coarse" communications between client and server.

Casual support for ubiquitous and disconnected access (user can log on from different locations and see the same media items):
  the entire user state must be mirrored at the server for later recovery;
  in case of client-side catastrophes, we accept that latest updates to the client may not make it to the server;
  multiple clients programs may share the same user ID; user ID is passed on to the server;
  the protocol should be two-way idempotent, meaning that either client or server should be able to re-send portions of a message repeatedly without breaking the other side;
  the protocol shall be connection-less (there are likely to be very few calls between client and server that happen over long periods of time, so it is not worth keeping a connection).

Allow media items to be stored on multiple, heterogeneous, autonomous sites:
  media items may move about the site; Pixxa treats different "copies" of the same media item as the same and deals with the same media item in multiple formats;
  cannot depend on names and/or modification date for comparison.

Updating server-side is generally cheap; updating clients is expensive:
  make the client relatively stable so changes in the system can be enforced via server-side changes;
  move as much logic as possible to the server;
  do all fingerprinting of media items on the server-side.

The following is a brief list of some of the advances Pixxa has made from the state of the art.

While there are other personalized screensavers, PIXXA provides screensavers that exhibit shared internet multimedia and mass-customized exhibition of audivisual information as part of their operation. One of the major advances in Pixxa is that its content is produced by masses of people, instead of just plain old personalizations. Pixxa employs algorithms to send updates to individual screensavers when some member has changed his or her preferences. Moreover, Pixxa allows this sharing to take place over the long term while allowing clients to detach from the computer network (making Pixxa ideal for mostly-disconnected devices such as laptop computers or multi-media enabled palm devices).

Figure 3C:
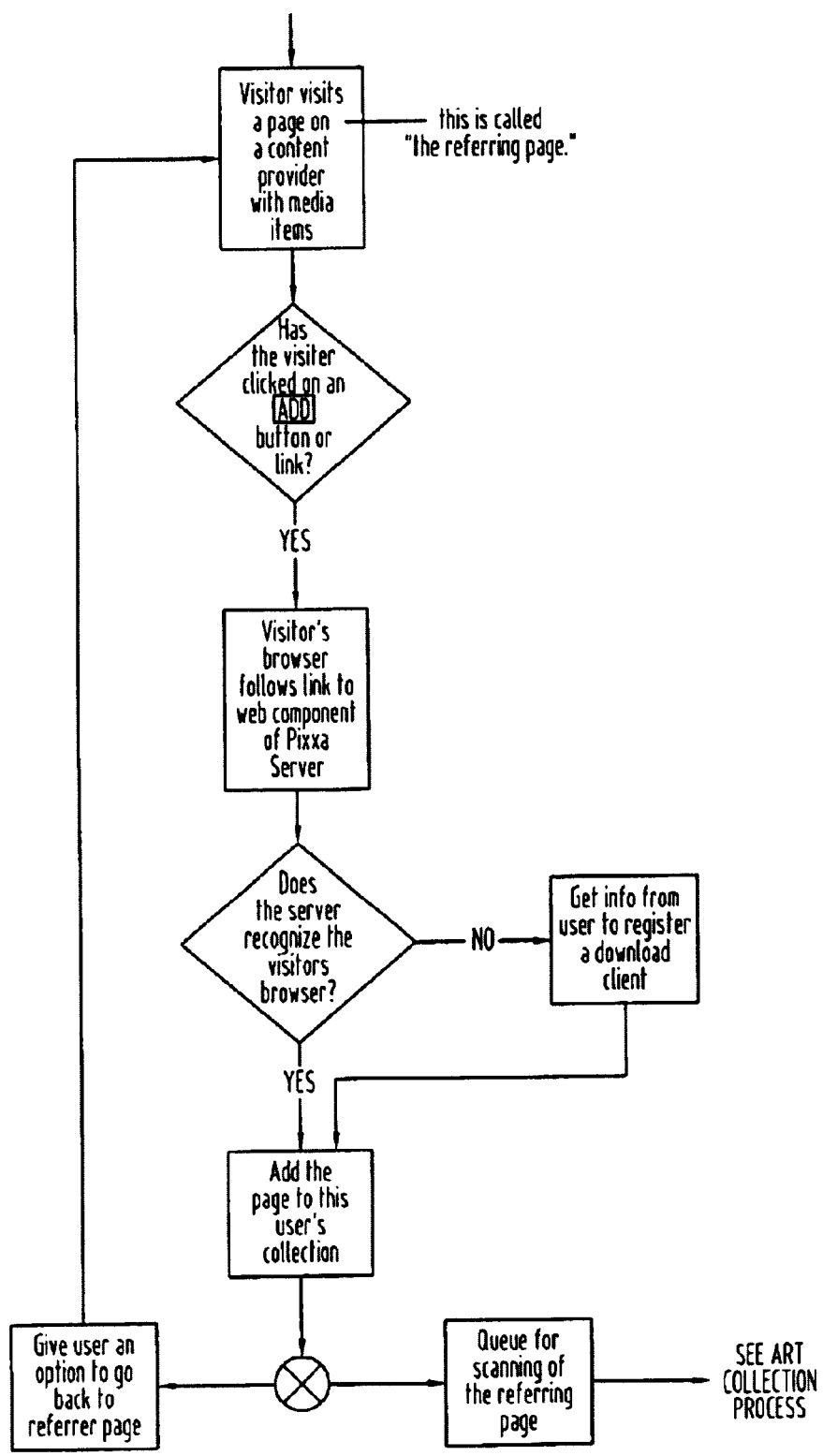
FIG. 3C is a flowchart that illustrates the one-click sharing process.

Referring to FIG. 3C, the one-click sharing process is illustrated. With a single click from any web page of any site, any user can add the images included in that page into the user's Pixxa screensaver, and share them with others. Unlike Amazon's 1-click shopping, it is used for sharing of multimedia equipment on the web. Third parties can create screensavers for media contents on the third party's site (e.g., the third party's family's pictures on the third party's home page) by creating a single link to the Pixxa server. By employing HTTP features (such as cookies and the referrer field), Pixxa can allow any user who goes to someone's home page to be led to Pixxa.com and automatically scan the contents of the third-party site for images and add those images to the Pixxa screensaver for the user.

Figure 3D:
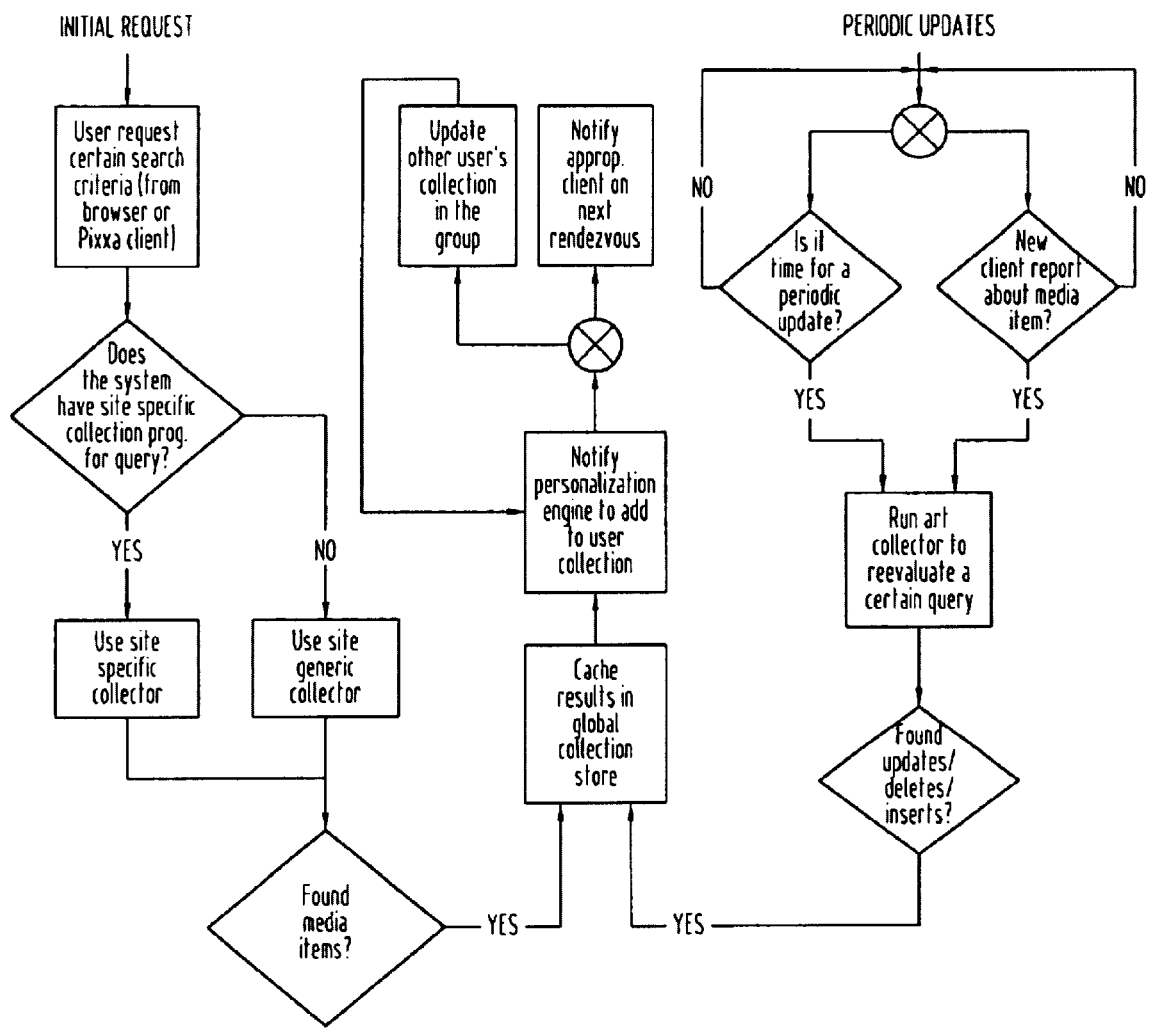
FIG. 3D is a flowchart that illustrates the art collection process.

Referring to FIG. 3D, the art collection process is illustrated. When a user requests certain search criteria, a site-specific collection procedure is used if it exists for the query; otherwise a generic collector is used. If media items are found, results are cached in a global collection store and the personalization engine is notified to add to the user collection. The collections of other users in the group are updated and the appropriate client is notified on the next rendezvous. When it is time for a periodic update or when a new client report about media items is present, the art collector is run to re-evaluate a certain query.

Figure 3E:
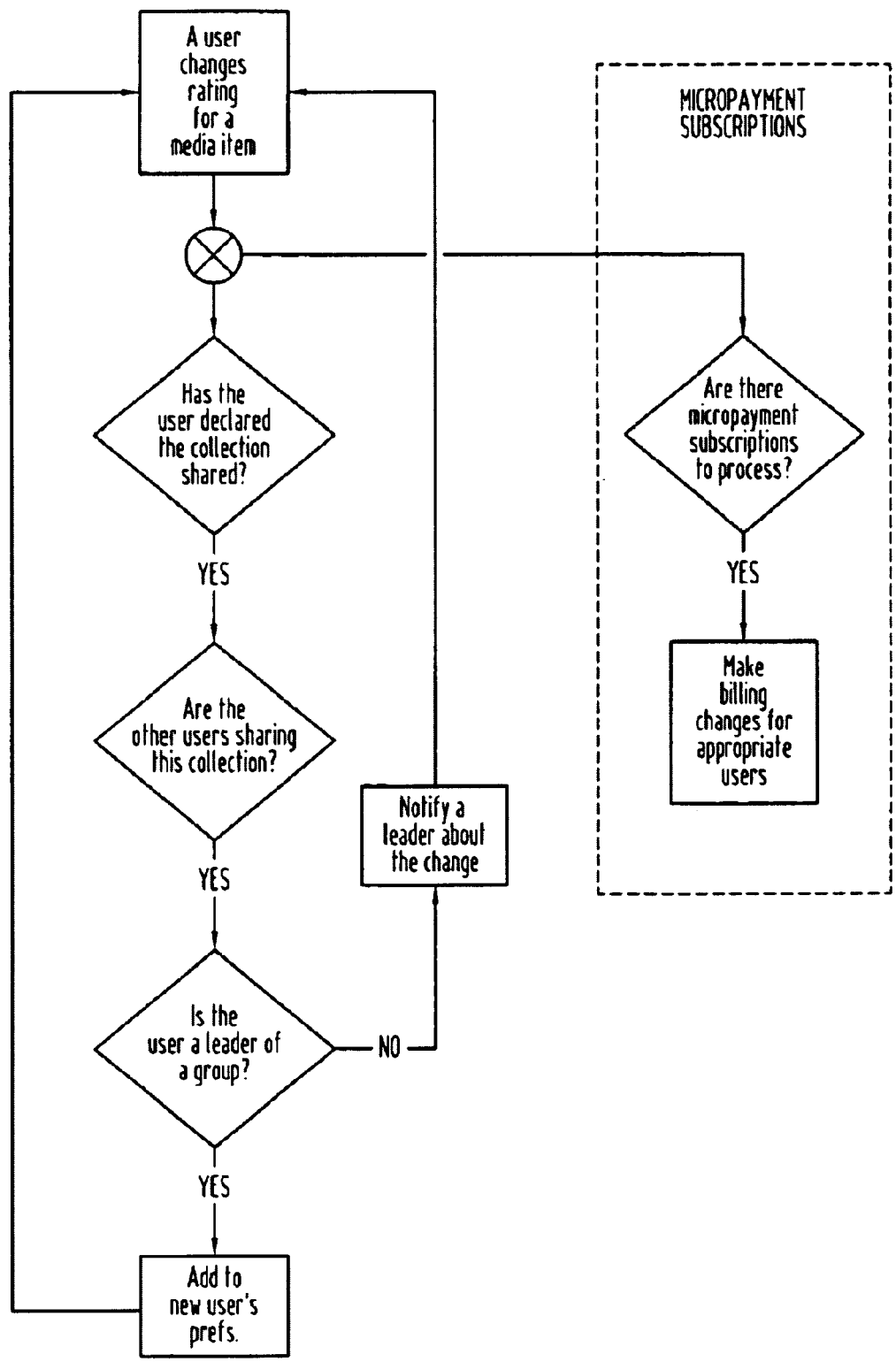
FIG. 3E is a flowchart that illustrates the collaborative personalization aspect.

Referring to FIG. 3E, the collaborative personalization aspect is illustrated. When a user changes a rating for a media item and the user has declared the collection shared, a leader of the group is notified of the change unless the user is himself or herself the lead, in which case the change is added to the user's preferences. If there are micro-payment subscriptions to process; billing changes are made for the appropriate users.

Instead of using URLs to identify pictures, Pixxa can use the fingerprint of the image. This helps Pixxa deal with dynamically-generated URLs. A fingerprint is a checksum calculated quickly from the entire content of an image. It is nearly impossible for two fingerprints to be the same if two images are different. So, this can be used to make sure the same image is not displayed multiple times, even if it has two URLs.

Pixxa uses pseudo-random numbers for making the sequence of displayed images look "arbitrary." However, Pixxa is designed so that this sequence can be "replayed" from any other location, or to allow the user to go back and forth in the same random sequence. This is useful because a user can "suspend" his or her random sequence when he or she leave home and continue it upon getting to work. Or it will allow the entire content of a catalog to be shown before any repeated items are displayed.

Instead of transferring images themselves, PXP concentrates on synchronizing meta-level information, and the Pixxa server keeps track of this meta-information about media items on the web. Like the way Yahoo provides meta-level browsing of the web, the Pixxa server can provide "scanning" of images of the web by making many collections and single items available for users to add to their collections. So, a user browses the "Pixxa Portal" on the user's browser; by clicking on a link or a button the user can add an entire collection or a single item to the user's own screensaver. This provides a high level of integration for the users. Note also that Pixxa allows any other site to add collections with a single click as well. As part of this generic meta-level communication, Pixxa does not require a priori decisions about preference settings. The set of preferences set by the user is communicated as part of the protocol.

If a user changes his or her screensaver by marking that the user likes or dislikes a picture, any other user that has "subscribed" to the collection for the original user will see the changes reflected on their screens. This will allow friends and family to "attach" to each other's collections, or "sharing circles" where different people have the capability to add and delete into a collection.

Pixxa client can work either as a screensaver or as an application in the "background" such as wallpaper. The client is designed so that it can morph back and forth from its "peripheral" mode to take over the entire screen. Pixxa is also designed that when it fails to interact with the user it can still operate (perhaps in less optimized way).

Certain users may want to make their collections of pictures available for a fee, for example, because they have painstakingly harvested them. Other users will have to pay to subscribe to the original user's collection. Alternatively, some content providers may want to pay users to see their images. For example, a user may get a small monetary incentive for adding certain commercial collections to the user's screensaver (just like television commercials). Micropayment techniques can be used here, however, they may take on more of a subscription rather than single-purchase form. For example, Gap, Inc. could pay a user $1/month to include their images as part of the user's screensaver.

Certain users may opt to pay for a service that filters out certain content (for example pornography). This is similar to the phone company charging subscribers for not including them in the phone directory. Other users may be charged for commercial use of the site, either as a lump sum or a percentage.

Figure 3F:
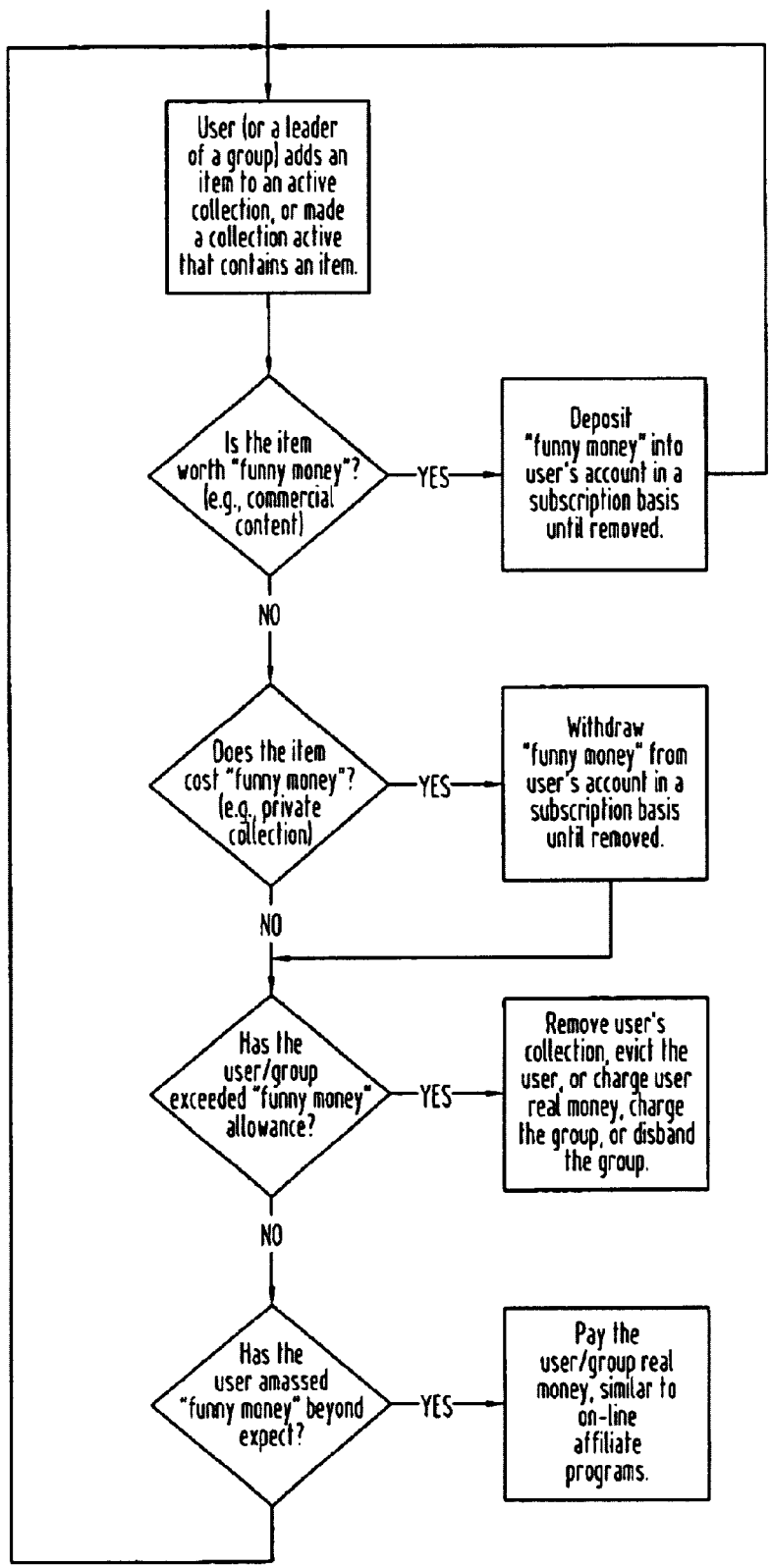
FIG. 3F is a flowchart that illustrates the micropayment subscription process.
Figure 4:
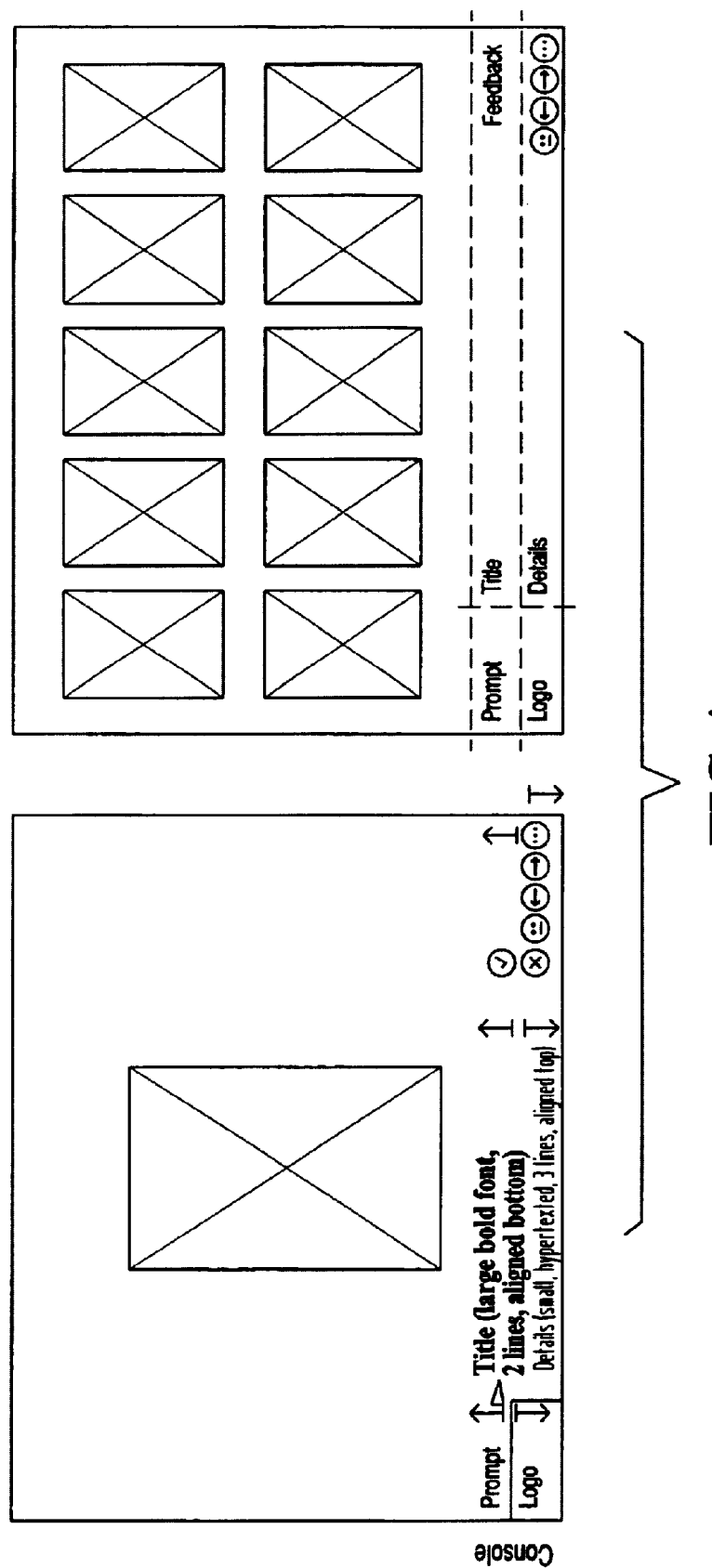
FIG. 4 is an illustration of the Pixxa visual structure.
Figure 5:
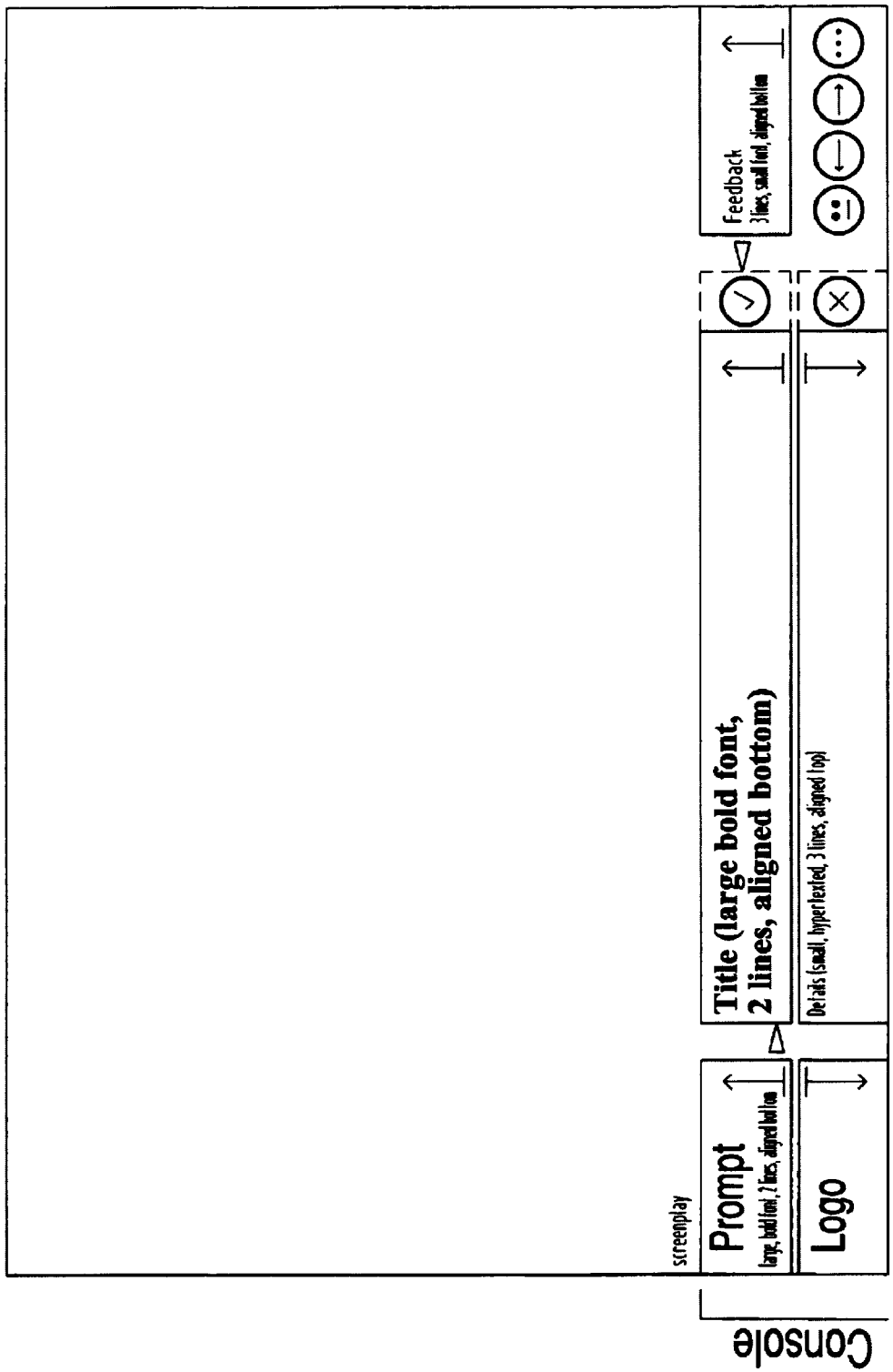
FIG. 5 is an enlarged illustration of the Pixxa visual structure.
Figure 6A:
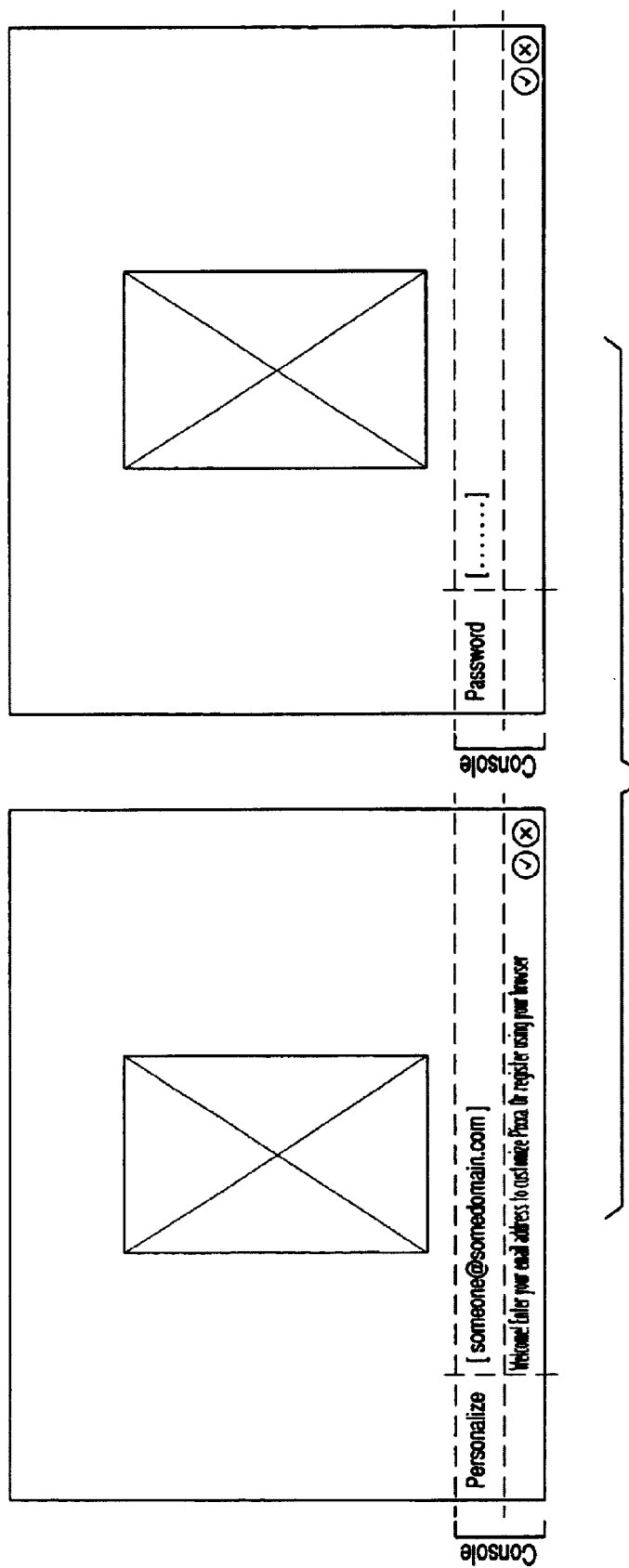
FIGS. 6A and 6B are illustrations of exemplary Pixxa dialog screens.
Figure 6B:
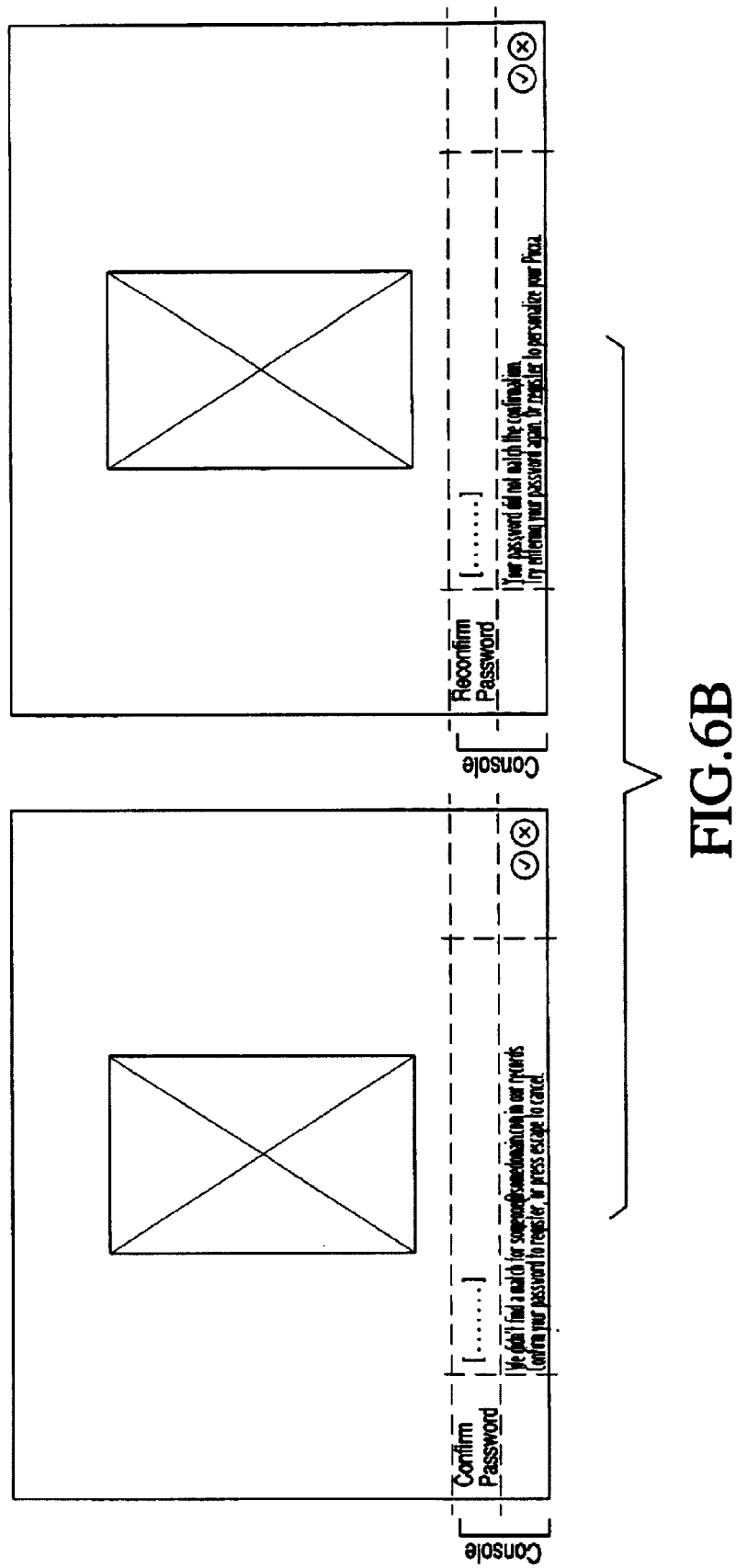
Figure 7:
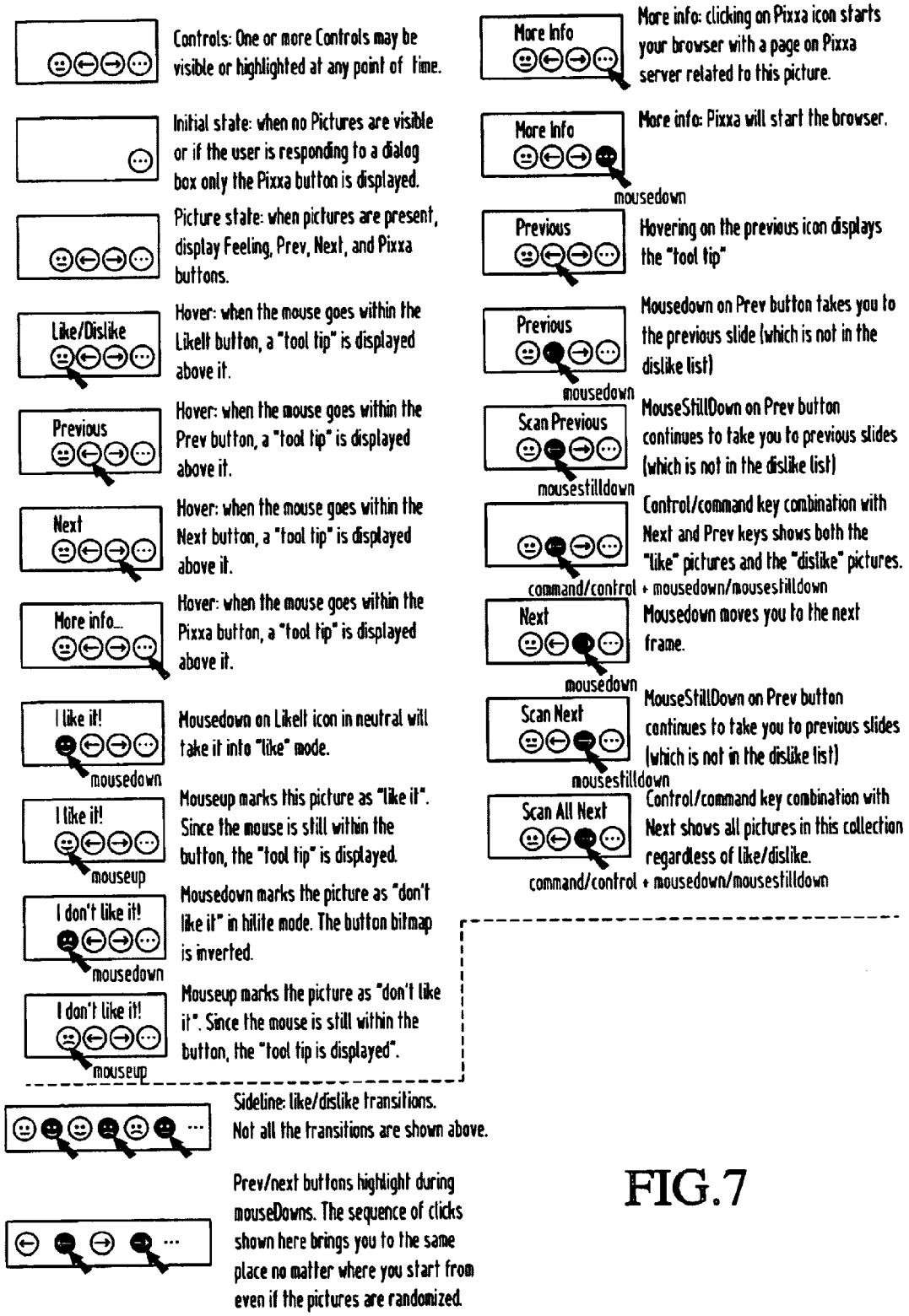
FIG. 7 is an illustration of Pixxa controls and icons.

Referring to FIG. 3F, the micropayment subscription process is illustrated. Pixxa implements a micropayment subscription model and a marketplace for making and spending "funny money." Each user is allocated a certain allowance of funny money. Users and groups that take on certain actions that are beneficial to the community/system (e.g., ones with commercial subscriptions, such as the latest books from Amazon.com) are rewarded with funny money. Users and groups that do things that cost the community/system (e.g., creating private collections and not sharing them) are charged funny money. A user with a negative allowance is evicted or charged real money. A group with a negative allowance is charged real money or disbanded. A user with excessive amounts of funny money can trade it for real money.

Vendors with commercial content can pay real money to provide their collections to the end-users, but in contrast to regular advertisements, the users have the last say as to what they want to see as part of their collections. There are different costs associated with subscribing to different items.

Pixxa uses a rendezvous model for client-server communication. Within a rendezvous, servers can balance their loads by providing hints or instructions to clients as to the next time for rendezvous. This may not provide real-time update but allows a modest server to serve large number of clients. The entire Pixxa protocol reflects this idea so that it can scale to millions of users. For example, Pixxa clients act as probes for Pixxa servers, letting the servers know when certain images do not match client's expectations as set by server.

Referring to FIGS. 4–7, the client's primary user interface is a screensaver (though it may be activated directly by the user as well as a standalone application taking up some portion of the screen, or a wallpaper). Unlike other screensavers, though, the client must keep track of its state across sessions and synchronize its state with the server periodically.

To fully appreciate how Pixxa can be most effectively used by various organizations, several application scenarios are summarized below. Many other applications are possible; the following were chosen to provide a broad survey of possibilities.

E-commerce companies such as Amazon.com currently recommend books and music to customers based on their current and past purchases and searches they perform within the books and music areas. Pixxa would provide information based on a much broader spectrum of interests, since the searches a user would perform to construct his personalized screenplay would have no artificial boundaries. Amazon can link in its usual marketing engines (people who bought this book also like this other book) as well as using the marketing information collected by Pixxa screensavers.

Pixxa can be used to augment services provided by digital photography and multimedia content vendors and community sites such as Kodak.com, Geocities.com, MP3.com, and Real.com. With a single click, the users can construct personalized screensavers from images on such sites and share them with their peers. Pixxa can also be deployed so that it plays music while displaying images, combining visual and audio information.

Pixxa could extend the infrastructure provided by a company such as American Online in an unobtrusive yet powerful way. The general approach used by such an infrastructure is to create a horizontal communication used by millions of people around the world. It's command, however, is limited to its customers' online communication needs (AOL, AIM and the web browser). When the customer is no longer online, the infrastructure is no longer in the loop. Consider a typical user. While online, Pixxa Delivery is downloaded to the user's desktop and the user enters his Pixxa screensaver preferences. These preferences are passed to the server and saved there. The server will then turn preference queries into URLs pointing to images on the web. The screensaver and the server will synchronize the image URLs periodically. The images are downloaded while the user is online and displayed as a screensaver even when the user is not using the computer. And, although Pixxa operates even if the computer is not connected to the online infrastrastructure, clicking on a picture will fire up a browser to display the page that contained that picture, by reconnecting to the online infrastructure. An online infrastructure could leverage Pixxa in a number of ways: Pixxa will encourage the customer of the online infrastructure to visit its massive content sites, such as AOL.com and digitacity.com to follow up on images pertaining to news, sports, entertainment, photo galleries, and netcenter. Thus, Pixxa coudl dramatically increase the online infrastructure's offerings to its affiliates and advertising sponsors by increasing its presence at the customer's desktop, and by increasing click-through rates. Pixxa can track consumer interests so that the online infrastructure can find better matches for advertising. It can track both high level interests (search terms, images the customer likes, for example, Boston Red Sox, hot air balloons, lighthouses, etc.) and lower level ones (images discarded by the customer). The final choices made for a screensaver will be much more accurate than the transient choices made with GO Keywords.

Behind the stories of a news site such as CNN is considerable talent in photography. In many ways, good photographs separate a "real" news organization from a "virtual" one. Pixxa will enable large news organizations to leverage their size over smaller ones who cannot afford a world-class photography staff (for example, certan news websites have no photographs). Once people find pictures they like, they tend to keep them and look at them over and over. Using Pixxa, they will, over time, amass a detailed profile of their individual and shared likes and dislikes. This profile will be useful to suppliers of products and services, since it will allow these products and services to be offered to users who are much stronger potential customers for them. Note that since the user will be able to specify whether he likes a particular image, clicking on Pixxa's "like" button will be a much stronger indicator of preference than the clicking that occurs as part of usual news browsing. Since Pixxa will allow the user to follow a link from an image of interest to the page behind it, exposure to news content pages will increase. And, the logo on the bottom of the Pixxa screen will act as constant advertising when no other logo is visible. Note that in this context, Pixxa does not carry real-time new information of any kind, but meta-information about audio-visual portions of a news article.

A user of an auction site can subscribe to a Pixxa auction collection for a particular search criteria (e.g., "Russian Posters on ebay.com"). The Pixxa server scans the web site and send the Pixxa client information about the relevant images and descriptions. The Pixxa client can then display the images and the text when the user is not directly using their computer, allowing the user to keep up with the latest changes in this search. The Pixxa client can make the new arrivals so that the user is alerted to the changes. As the auction items are added and deleted from the auction site, the pictures are added and removed from the Pixxa collection automatically. When user notices a picture they care about, and he can click on the image to go directly to the web page on the auction site that is featuring the item. This allows the user to "window shop" the auction site, i.e., keeping track of what is going on at the site without visiting the site at all times. Each auction picture in Pixxa may be displayed with corresponding text that describes the item, the current bid, when the auction ends.

The client uses a design that is as minimal as possible for its user interface. Much of the information displayed on the screen is parameterized; it will be downloaded on the fly.

The visual architecture is divided into two parts: the "console," which is responsible for communication with the server, and which maintains the client state and the cache; and one or more "screenplays" that display the images and text in using different styles. The screenplays implement a plug-in architecture, i.e., I should be able to specify a full plug-in without having to change the console at all. There are four screenplays: a "default screenplay" (put up the logo and do some rotation of a certain set of images while asking for the user name and password); a full-sized image in the center of the screen (if the image does not fit on the screen, it must be resized by a whole binary factor (e.g., ½, ⅓, ¼) to make it fit); a bouncing thumbnail (it will stop bouncing when the mouse is within the icon); and a "small multiples" player (incrementally show small thumbnails on a pre-defined grid on the screen, say, 1 inch by 1 inch, showing the collection name in the bottom; when the mouse rolls over is within a particular image, it should be highlighted by a #highlightcolor border and its title and detail information should appear at the 'console' portion).

Note that the background color (bgcolor), foreground color (fgcolor) and highlight color (hicolor) are changeable as per request of the server.

Each media item has an associated: page (URL of the page the media item points to); src (Source URL of the media item); thumb (the URL of a thumb image for this media item, in JPEG or GIF; title (the description of this media item); mimetype (the MIME type for this item); details (fine print about the media item, including copyright info); and rating for each member media item (in scale of 0 . . . 7, see below).

Media items are grouped together in "collections." The following items are associated with a collection: one or more media items; sequencing policy (random or sequential); fgcolor, bgcolor and hicolor; transitions between item display.

The sequencing policy is a function that decides what to display based on what has been displayed so far, and the other characteristics of the collection. It should be possible to fine-tune the sequencing policy by making changes in a single procedure.

The client must keep track of the following at all times:
the user name and password (saved to disk when chosen by the user;
cached images (and their corresponding meta data, i.e., what is the name of the image, etc.); These are persistent across sessions and reloaded from disk the next time the screensaver runs;
an associated list of images with like/dislike ratings (0 . . . 7). 0=don't like; 1=neutral; 2=like; 3–7=reserved for future use; other information about media items displayed, including clickthroughs to server and their type, i.e., what did the user click on, including single graphic, bouncing graphic, small multiples graphic, title, and detail.

This information will be communicated to the server next time client and server rendezvous.

State (such as the current cache) that becomes persistent (i.e., savedto disk) should use a predefined format (perhaps it can use the "ClientResponse" subset of the XML for the Pixxa Synchronization Protocol).

Code is to be maintained by other programmers so it must stand by itself. This is of utmost importance. Pixxa staff can check the quality of the code during development in order to make sure it can be maintained by another programmer. Parameters of the program (e.g., the server name, of the program) should be parametrized by constants, and they should have setters and getter calls unless this is performance prohibitive.

All fixed text messages should come from cast members. Changing ordinary wording of messages should be straightforward, i.e., should not require any coding.

Director implementation of Pixxa is factored into a plug-in architecture. There is a single console plus one or screenplayers, each of which is playing a collection screenplay. Calls between console and player can be synchronous like function calls that do not return until they are done.

The console responsibilities include collection management, persistence of downloaded items, pxp communication and rendezvous, opening web browser, and logical sequencing of items.

The screenplay responsibilities include display concerns, how many items to show and where to show them, any dynamic behavior such as movement of pictures on the screen, and timing of how long things get displayed on the screen.

The screenplayer API may by configured to accommodate multimedia types that have temporal characteristics (such as quicktime movies). A collection may have a list of valid screenplayers instead of a single screenplayer, and the console may choose the first available screenplayer from the list. There may be multiple screenplayers active at the same time (e.g., each area of the screen is associated with a different screenplayer).

Operations on a screenplay include:
new (screenplayerid, collectionid): creates a new screenplayer with the associated id; the screenplayer passes this id with any of its calls to console;

set_focus (itemid): asks the screenplayer to make the image with certain id its focus;

swap_out (desired): {min,max}: console asks the screenplayer to return its min and max number of seconds to swap out; it passes desired to give some context for its query; a screenplayer can take this message as a hint that the console will ask it to close itself within min-max seconds;

close(nsecs): stop this player in nsecs.

Operations on console include:

get_screen_coords (screenplayerid, colid): returns the screen coordinates for this player; colid is the collection id;

get_color_scheme (screenplayerid, colid): returns the color scheme (bgcolor, fgcolor, . . . );

exited (screenplayerid, colid): when the screenplayer notices an "exit gesture" it will ask the console to exit, but it is really up to the console to do the right thing at this point;

goto_item (screenplayerid, colid, itemid, type-of-interaction): when the screenplayer notices a click on a certain item, it may try to visit its related page;

get_items_info (screenplayerid, colid, list of itemids): returns an item->item_info dictionary where item_info includes the item contents, as well as materialiezd_source, materialized_thumb flags; if there are internal director ids for these items or item objects, then they should be returned also;

get_current_items (screenplayerid, colid, n): if n is zero (default) then just return the current item id; if n is positive then return the next n items, including the current item (returns n+1 items); if n is negative then return the current item, appended with the id of the previous n items (in reverse order, returns (n+1) items);

set_current (screenplayerid, colid, itemid): sets the "current item" for a particular collection.

Possible screenplayers include:

"slideshow" screenplay (shows single full image);

"quotation" screenplay (shows only the title of the item, no images);

multi-thumbnail screenplayer;

thumbnail (move about the screen screenplay; expands when clicked on);

ini thumbnail screenplayer (for future "iconized" mode);

"jukebox" (plays multiple quicktime movies in a row)

We list the steps in a typical scenario below:

1. Console is activated
2. Console decides on one of the collections.
3. Console picks the first available screenplayer in the list of screenplayers listed for the "current collection" (in one embodiment, each collection is mapped directly to a screenplay).
4. Console activates the screenplayer.
5. Screenplayer asks for the "next n" items to display, passing in the collection ID.
6. Console returns the "current n" items, using the sequencing algorithm specified in the protocol, sending back a table of items along with flags as to whether their thumb or actual content has been materialized. Screenplayers are encouraged to ask for "next n" every time they redraw their screen (for example, when they put up a list of thumbnails).
7. The screenplayer at any time can query the console for item and materialization information on its contents or thumb contents. Also accompanied is the liking for this item.
8. If the user presses next or previous, the console will kick the screenplayer and tell it to make a certain item the focus. If the screenplayer doesn't know about this item, it can ask for "current n" items to display. The console should ensure that the "current item" of any collection is passed as the "current n" items. To do next, the screen player takes the item after the first item.
9. The screenplay can at any time set the "current item." The next time the screenplayer asks for the "next n," the "current item" is assumed as its starting point.
10. The user moves the mouse across screenplayer; it notices an exit gesture and asks the console to exit.

The pseudo-code for this scenario is as follows:

1. console.new( )
2. curcol=one of current collections
3. sp=screenplayers[curcol.screenplay]—screenplayerid is spid
4. sp.new(spid, curcol)
5/6. console.next(spid, colid)
   in case of single page
5/6. console.next(spid, 4*3-1)
   in case of 4×3 display
7. console.get_items_info (spid, colid, ["391020" "202929," "9932923"])
   the list members are item ids
   the console returns item_infos on these
8. sp.set_focus("391020")
8. sp.set_focus("202929")
9. console.set_current ("202929")
10. console.exited (spid, colid)

The screenplay sends reports into the console.

Appendix A specifies the Pixxa Exchange Protocol (PXP), the communication protocol between the client and the server components of Pixxa. Pixxa Exchange Protocol builds on top of standard transport protocols (TCP/IP, HTTP) and encodings (XML, GIF, JPEG, URL, and MIME standards.)

The Pixxa System consists of users, media items, and collections. Each user has an identification (ID) and a set of collections. Each collection has an ID and a set of media items in that collection. Each media item has an ID (used for identity comparison); a name (short name of the object); an SRC (i.e., where the content of this media item resides) (e.g., the SRC of the IMG tag); a mimetype (i.e., what type of item this is, e.g., it could be image/jpeg image/gif); a title (the title screen displayed for this item); a page (the source page where we got this item); and details (the fine print on this item, e.g., copyright info on images).

The goal of the Pixxa Exchange Protocol is to have the client and the server share the same "knowledge" as to set of collections and the items in the collections for a particular user. The client should be able to operate with partial collections at any time. Note that the media in various collections may not reside on the Pixxa server; they may be anywhere on the Internet.

A media item may be "materialized," which means that its content has been copied to the client-side cache. The client-side cache is persistent across restarts of the client. Note that the same user may have a client on multiple machines; these will effectively be replicated but they may have different media items materialized.

A sound sameness criterion for media items will be difficult to define formally, especially across different formats. In one embodiment, each media item has a unique ID. In another embodiment, collections are "true sets" in which only one instance of the same media item exists. In a third embodiment, a form of "fingerprints" for media item equality is used.

Each media item has a 'preference rating' that describes how well the user likes that media item:

0=ambivalent or unrated (don't care)

positive=like negative=dislike

Each media item starts with zero rating. Items may be promoted (or demoted) by the user to increase (or decrease) their preference rating by one unit. Items with negative rating do not get displayed on the client unless explicitly requested. The higher the rating of the media item, the more frequently it is displayed.

The Pixxa client and server communicate via HTTP messages encoded in XML. The DTD is not defined yet; we attempt to specify the protocol by example here.

A typical interaction between the client and server is as follows:

|   | Client | Server |
|---|---|---|
| 1. | >>>> userinfo | >>>>>> |
| 2. |  | rendezvous info, <<<<<< |
|   |  | latest matches, |
|   |  | <<<< schema changes |
| 3. | >>>> rendezvous info, |  |
|   | like/dislikes | >>>>>> |
| 4. |  | rendezvous info, <<<<<< |
|   |  | latest matches, |
|   |  | <<<< schema changes |
|   | .... repeat 3 and 4 ...... |  |

We explain the above-listed steps below:

1. When the client starts, it will send user id, password to the server as part of userinfo. These are shaped as DialogReponse name-value pairs.

2. The server will send back a set of changes for the latest matches to the client in response to this request. In case the system has had any schema changes (i.e., media items that have been deleted or modified), the changes are also communicated. Finally, through the rendezvous info, the server also tells the client when to contact it again and what the client needs to present to the server.

3. The client sends the latest likes and dislike sets, including the rendezvous info it got form the server.

4. Repeat steps 2 and 3.

See below for further exceptions.

The client and server communicate via a single HTTP request. We follow a "rendezvous" model. The client will make these HTTP calls to the server over long periods of time, An HTTP message formatted as a ClientRequest results in a ServerResponse:

| Client | Server |
|---|---|
| >>>>> ClientRequest >>>> |  |
|  | <<<<< ServerResponse <<<< |

The client and server grammars are described in quasi-EBNF style in this section.

| CLIENT-SIDE | | |
|---|---|---|
| ClientRequest | ::= InitialClientRequest | ... request to send on the first contact ... |
|  | \| RegularClientRequest | ... request to send after the first contact ... |
| InitialClientRequest | ::= InitialDialogResponse | ... initial handshake ... |
|  | [ ClientChanges ] | ... and some client changes ... |
| RegularClientRequst | ::= RendezvousInfo | ... info client got from last rendezvous ... |
|  | [ ClientCollections ] | ... what collections are active on the client ... |
|  | [ ClientChanges ] | ... what changed since last visit ... |
|  | [ DialogResponse ] | ... response to the dialogs server requested ... |
| InitialDialogResponse | ::= UsernameDialogResponse | ... username dialog response ... |
|  | PasswordDialogResponse | ... initial handshake passes user name and password ... |
| ClientChanges | ::= Report* | ... client sends reports back to server as to what happened. |
| Report | ::= ReportType | ... what type of report ... |
|  | ReportOptions | ... optional parameters ... |
|  | Item* | ... zero or more items ... |
| Item | ::= ItemId | ... identifies the item in any collection ... |
|  | \| CollectionId | ... identifies the entire collection ... |
|  | \| ItemId CollectionId | ... identifies the item in a single collection ... |
|  | [ ItemNote ] | ... note attached to this item ... |
| DialogResponse | ::= NameValuePair* | ... one or more bindings to variables ... |

Reports are the primary method for a client to communicate with the server. The syntax for reports has been unified so that it can easily be extend for new uses. A report consists of a 'type', an 'options' string, and a set of 'items'. An item has an "ID" attribute that uniquely identifies this item.

A Preference report indicates that the users' likes and dislikes in the current set of collections. The options set to "−1," "+1" or "0" affect the entire collection. The Preference report can indicate a specific item in any collection, or the entire collection.

Reports are sent by a client that has trouble performing certain operations, for example, downloading media items or manipulating collections. When collection operations fail, their failure is reported in a report. The Problem report can indicate a specific item in any collection, or an entire collection.

See the list of report types at the end of this section for further detail.

When the client cannot reach certain media items, it sends a "media failure" problem report in the next rendezvous. The Media Failure report can indicate a specific item in any collection, or an entire collection.

Stale item reports are sent as part of client requests; the server usually refreshes the entire value for the item. This is an unusual request by the client; there is evidently something wrong with the data gathered by the client. The Stale Item report can indicate a specific item in any collection, or an entire collection.

A stale everything report occurs when the entire client cache is stale, invalid, or empty. The client should receive the entire collection for this particular user.

In a clickthrough count report, note="kind count," count is an integer, and "kind" is a string: thumb, actual, title, details, morebutton, logo.

Note that these reports are hints to the server. While the server must do its best to fix the cause of the report, it is not obligated to do anything about a report. The client can continue reporting the problem.

The following is a list of valid client-side reports:

preference
duplicate_item_insert
unknown_collection_insert
unknown_collection_delete
unknown_item_update
unknown_collection_delete
unknown_item_delete
clickthrough_count The following is a list of valid client-side and server-side reports:

stale_item
stale_everything
unknown_item_referenced
unknown_collection_referenced
unknown_variable_referenced

SERVER-SIDE

| | | |
|---|---|---|
| ServerResponse | ::= RendezvousInfo | ... last rendezvous info ... |
| | DialogRequest* | ... dialog requests for client ... |
| | Collection* | ... active collections to display ... |
| | [ ServerChanges ] | ... update as to what changed on server ... |
| | [ ServerQuery ] | ... server querying client ... |
| Collection | ::= CollectionId | ... id of the collection (may be a string) ... |
| | [ CollectionTitle ] | ... name of the collection ... |
| | [ CollectionScreenPlay ] | ... the required screenplay, if doesn't exist, download it from a fixed URL ... |
| | [ CollectionCreatorItem ] | ... a media item describing the collection creator e.g., the logo image, the name, and so on ... |
| | [ CollectionFgColor ] | ... Foreground color ... |
| | [ CollectionBgColor ] | ... Background color ... |
| | [ CollectionHiColor ] | ... Background color ... |
| | [ CollectionUnColor ] | ... Disabled Color ... |
| | [ CollectionScreenPlayParams ] | ... Special parameters for the screenplay, including transition specification, etc ... |
| | [ CollectionSize ] | ... Collection size on server ... |
| | [ CollectionSequenceOrigin ] | ... Where to start indexing ... |
| | [ CollectionSequenceIncrement ] | ... Increment index by this amount ... |
| ServerChanges | ::= Insert* Update* Delete* | |
| Insert \| Update | ::= ItemId | ... id of the media item ... |
| | [ ItemCol ] | ... id of the collection ... |
| | [ ItemPos ] | ... position in the collection ... |
| | [ ItemSrc ] | ... where to get the media item ... |
| | [ ItemTitle ] | ... name of media item ... |
| | [ ItemDetails ] | ... details of media item ... |
| | [ ItemPage ] | ... URL of HTML description ... |
| | [ ItemRating ] | ... ratings for this media item ... |
| | [ ItemType ] | ... mime type for this media item ... |
| | [ ItemInfo ] | ... media-type-specific string, e.g., "bbox = 200 × 400." ... |
| | } | |
| Delete | ::= ItemId | ... id of the media item ... |
| | ItemCol | ... id of the collection ... |
| Rating | ::= +inf ... 0 ... -inf | ... rating for this media item ... |
| | | ... 0 is neutral, positive like, negative dislike ... |
| DialogRequest | ::= DialogRequestVarName | ... name of the variable that is being assigned ... |
| | DialogRequestPrompt | ... prompt to put up on screen ... |
| | DialogRequestType | ... what type of dialog ... |
| | [ DialogRequestDetails ] | ... details to show for the answer ... |
| | [ DialogDefaultValue ] | ... the default value for the answer ... |
| | [ DialogRequestPeriod ] | ... number of seconds to show the dialog ... |
| RendezvousInfo | ::= CurrentServerTime | ... current time on the server ... |
| | NextTicket | ... what to present at next rendezvous ... |
| | [ NextHostname ] | ... where to rendezvous next ... |
| | [ NextRendezvous ] | ... when to rendesvous next in seconds ... |

-continued

SERVER-SIDE

DialogRequestType is either:
    "text": typein the question allowing the user to type in
    "password": ask the question, allowing user to to type in "blind" mode,
        the response should be encrypted
    "inform": just display the detail information for the specified
        period of time without requiring user interaction
    "confirm": display the detail information for the specified
        period of time expecting an OK or Cancel.
    "choose": display a list of options, and let the user choose
        one. Treat default value as a comma-separate list of choices.
    "select": display a list of options, and let the user choose some or none.

When the server wants to insert a new media item in client's cache, it will issue an insert statement. If the same item already exists in the specified collection, then the client: updates the values as per insert record, and marks the item for report with type "duplicate_item_insert." If an item exists in this position then the client inserts the current record at the end of the collection and marks the collection for report in the next rendezvous with type "index_collision." If the collection does not exist, then the client creates the collection, inserts the value in the collection, and marks the collection for report with type "unknown_collection_insert."

The update element is useful for changing values associated with an image. In particular, it is possible to change the SRC URL for a particular image (to deal with reorganizations of external sites where images may live). This is done by overriding the "SRC" element of the update record. If the item referred to by "ID" doesn't exist, the client must create the item, update its fields as specified in the transmission, and mark the item for report of type "unknown_item_update." If an item with a different id is located in the same position as specified by the update, the position is set to the last item in the collection, and the item is marked for report of type "index_collision." If the collection referred to by "col" does not exist, the client must create the collection and mark the collection for report of type "unknown_collection_update."

By sending a delete statement, the server requests the client to delete a media item from a collection. The delete statement can delete from all collections or from a single collection, or it can delete an entire collection. If the item or collection does not exist, client marks it for report of type "unknown_item_delete" and "unknown_collection_delete" respectively.

The server may also issue reports to the client on occasion. Two types of server-side reports are stale_item and stale_everything This results in client's uploading its information about a particular set of items. This may be helpful in reconciling updates from two different clients, or in catastrophic cases where the server has completely lost information about a particular client or client and server have not been able to synchronize with each other due to some error for a long period of time. Since this is a very costly operation, it should be used with care.

Each server response carries the set of active collections. This set may change at any time, and the client should reflect the change by not displaying the inactive collections. When inserting, updating, or deleting an item is problematic, the client will take appropriate actions (as defined above). It will also mark the items and collections in question in problem reports that are passed back to the server in the next rendezvous. Collection operations may take place implcility when item operations are applied. For example, inserting an item into a nonexistent collection results in a new collection being created. Also, the server should conserve the bandwidth and not send collection statements if the client has already reported that it knows about a certain collection.

Items in a collection are indexed starting with zero. To sequence through a collection, the client may index through a collection using the following formula:

$i[0]$=origin;

$i[n]$=($i[n-1]$+increment) $MOD$ size;

where origin=CollectionSequenceOrigin;
increment=CollectionSequenceIncrement;
size=CollectionSize.

If $i[n]$ is not materialized, it is skipped; the client repeats this until an item in the collection has materialized. For example: {origin=0,increment=1) results in a sequential scan of the items; (origin=0,increment=largeprime) results in a random scan of the items that will eventually cover all the items.

Each response from the server may carry one or more dialog requests. Each dialog is marked with the rendezvous information passed down when the server initially requested the dialog. The client will prompt the user with this dialog. If the user responds in the specified period of time, the user's response is sent to the server in the next rendezvous. If the user does not respond to a dialog, the corresponding dialog response is not sent to the server. If this dialog response is crucial for server operation (for example, a confirmation password of a newly registered user), it may respond back again for the same prompt. This process is continued until the requested information is supplied.

Examples of two Pixxa client-server rendezvous within the Pixxa Exchange Protocol are illustrated in Appendix B.

Figure 8:
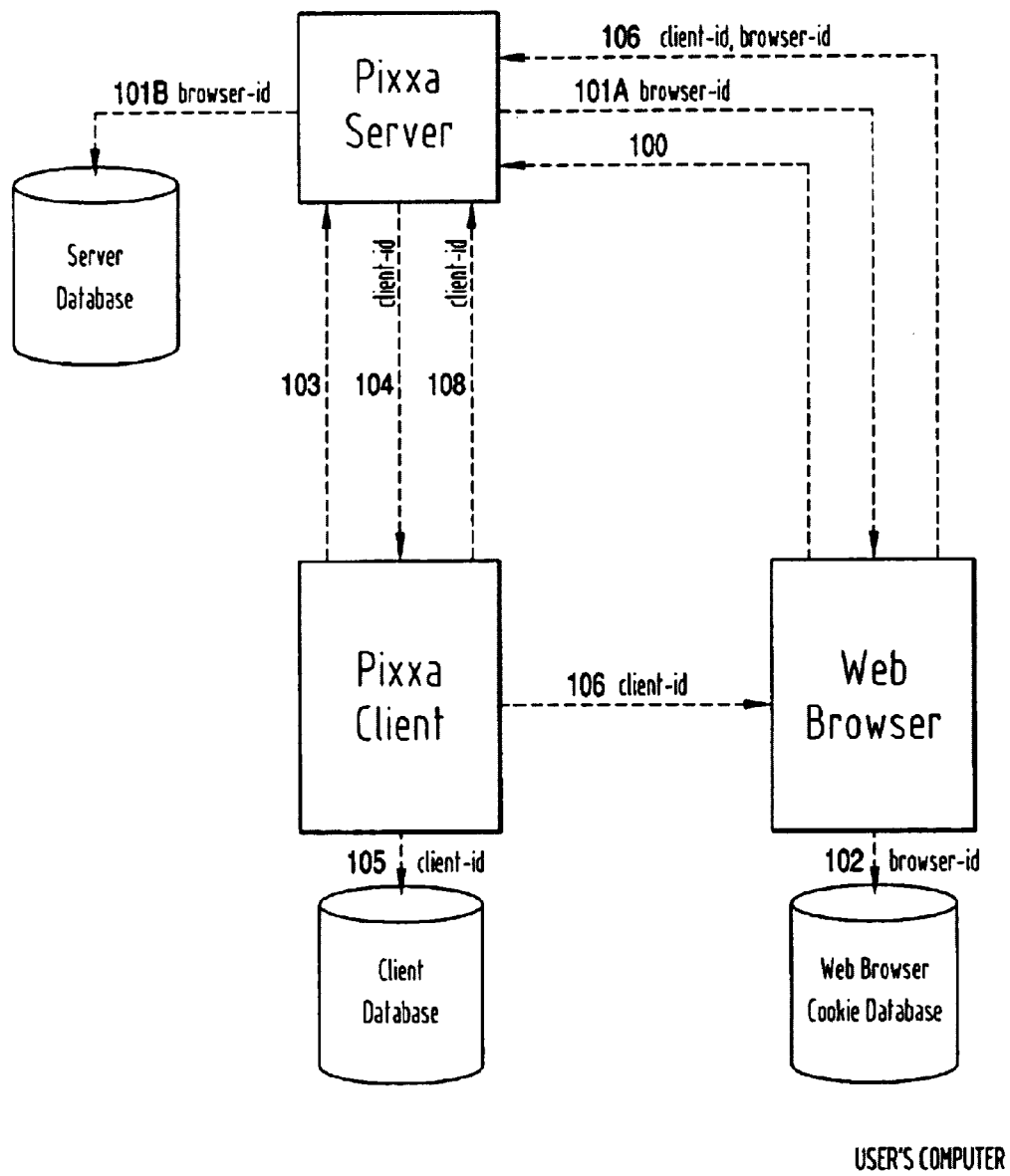
FIG. 8 is a diagram illustrating synchronization of Pixxa cookie information of a web browser with a Pixxa client.

FIG. 8 illustrates synchronization of Pixxa cookie information of a web browser with a Pixxa client.

Operations of Pixxa require the Pixxa server to identify Pixxa client accesses that correspond to web browser accessses on a particular computer. First, a user accesses the Pixxa web server using a standard web browser (step 100). The server (step 101*a*) sends back a "browser_id" cookie as part of the response to the web browser's request, and (step 101*b*) associates, in its server database, the "browser_id" with any other information that is provided to the server during user's visit. The browser saves the browser_id in its cookie database to present to the server in subsequent accesses (step 102). This browser_id will identify all accesses of the browser to the server. Then, the Pixxa client runs for the first time (step 103). It accesses the Pixxa server directly. The server sends a new, unique "client_id" to the client (step 104). This client_id identifies all accesses to the client to the server. The client stores this client_id in its internal database to present to the server for identification at later time (step 105). The Pixxa client issues a request via the web browser and passes the client_id it just received from the web server (step 106). The web browser also sends the browser_id as per standard cookie protocol. The web server matches (step 107) the browser_id cookie, from step 101*b* with the client_id, from step 104 so the server now knows which Pixxa client_id matches which browser_id. The client can now present the client_id to the server whenever it access the server (step 108), so that the server can match the client_id to the browser_id and return personalized information back to the user.

Note that in step 103 the client does not have access to the browser_id because the browser_id is embedded within the browser-specific database for the cookies. This browser-specific database is proprietary and private and should not be accessed by third party programs.

This method is used by Pixxa to allow the 1-click downloading of personalized clients from third-party sites. The third-party site simply links to a download URL on Pixxa's sites, where the collection_id refers to a particular Pixxa picture collection. When the user visits this, the server and web browser will perform step 101–103, associating the collection_id to the browser_id in the server's internal database, and trigger a download of a generic Pixxa client to the user's computer. The newly downloaded Pixxa client will do steps 104–108 working with server and web browser, at the end of which, the server will communicate the information regarding personalized collection that is identified by collection_id.

A number of embodiments of the invention have been described. Nevertheless, it will be understood that various modifications may be made without departing from the spirit and scope of the invention. For example, the use of Pixxa is not limited to images. The Pixxa delivery platform can be used for other purposes, for example, to allow downloading and tracking of MP3 files while showing images associated with those files as part of a screensaver or standalone application. All of the principles of Pixxa described herein can be applied to collections of images, text, movies, music or other sound, animations, 3-D virtual worlds, links to other objects, and other collections of content, which may or may not include images. Accordingly, other embodiments are within the scope of the following claims.

What is claimed is:

1. An Internet-based computer network comprising:
   a plurality of client computers corresponding to a community of users sharing a community customizable screensaver;
   at least one content provider computer; and
   a server computer;
   each of the plurality of client computers of the community being programmed to gather personal preferences of an associated user of the community with respect to content to be shared using the community customizable screensaver and to cause the personal preferences to be sent to the server computer;
   the server computer being programmed to receive the personal preferences from the plurality of client computers of the community and to cause one or more of the plurality of client computers of the community to retrieve content of the community customizable screensaver corresponding to the personal preferences of the users in the community for presentation by the community customizable screensaver.

2. The network of claim 1 wherein the client computer is a mobile device with display.

3. The network of claim 1 wherein the one or more of the client computers of the community are programmed to exclude presentation of content the community customizable screensaver based on input from a user of the one or more client computers.

4. An Internet-based computer network comprising:
   a plurality of client computers corresponding to a community of users sharing a community customizable screensaver;
   at least one content provider computer; and
   a server computer;
   each of the plurality of client computers of the community being programmed to receive content from the at least one content provider computer, to allow a user of each of the plurality of client computers of the community to perform a single action indicating a desire to include content in the community customizable screensaver, and to transmit information to the server computer indicating the desire to include the indicated content in the community customizable screensaver;
   the server computer being programmed to receive the information indicating the desire to include the indicated content in the community customizable screensaver and to cause one or more of the plurality of client computers in the community to retrieve the indicated content for presentation by the community customizable screensaver.

5. A method for implementing a community customizable screensaver on a network, the network including a plurality of client computers corresponding to a community of users sharing the community customizable screensaver, a plurality of content provider computers, and a server computer, the method comprising;
   receiving user preferences from the community of users corresponding to content for presentation by the community customizable screensaver;
   identifying reference information to provide access to content of the community customizable screen saver corresponding to the received user preferences of the community;
   transmitting the reference information from the sever to a client computer associated with a user in the community of users through a first connection;
   receiving the reference information at the client computer associated with the user;
   establishing a second connection from the client computer with one or more of plurality of the content provider computers;
   retrieving the content associated with the community screensaver at the location using the reference information; and
   presenting one or more of the retrieved content.

6. The method of claim 5 wherein identifying the reference information includes identifying a universal resource locator to access content of the community screensaver.

7. The method of claim 5 wherein presenting one or more content items includes presenting at least one of visual and audio content.

8. The method of claim 5 wherein presenting the content includes presenting multimedia content.

9. The method of claim 5 further comprising:
   actuating during presentation of the content, a hypertext link to the-content provider from which the content was accessed.

10. The method of claim 5 further comprising transmitting at least one report to the server regarding availability of the content from the content provider computers.

11. The method of claim 5 further comprising allowing a user of the client device to perform a single action indicating a desire to add the content to a user collection, and transmitting information to the server indicating the desire to include the content in the user collection.

12. The method of claim 5 further comprising accessing in response to the transmitted personal preferences, content corresponding to the personal preferences from at least one content provider, and periodically receiving updated information regarding the location of the content from the server.

13. A method in an Internet-based computer network comprising a plurality of client computers corresponding to a community of users sharing a community customizable screensaver, at least one content provider computer, and a server computer, the method comprising:
 each of the client computers associated with the community gathering personal preferences of one or more users of the community with respect to content for the community customizable screensaver;
 sending the personal preferences for the community customizable screensaver content to be sent to the server computer; and
 receiving the personal preferences for the community customizable screensaver content; and
 causing a plurality of client computers of the community to retrieve content of the community customizable screensaver corresponding to the personal preferences of the users in the community for presentation by the community customizable screensaver.

14. A method in an Internet-based computer network comprising a plurality of client computers corresponding to a community of users sharing a community customizable screensaver, at least one content provider computer, and a server computer, the method comprising:
 each of the plurality of client computers of the community receiving content from the at least one content provider computer allowing a user of each of the client computers computers of the community to perform a single action indicating a desire to include the content in the community customizable a screensaver, and transmitting information to the server computer indicating the desire to include the indicated content in the community customizable screensaver; and
 the server computer receiving the information indicating the desire to include the indicated content in the community customizable screensaver and causing one or more of the plurality of client computers of the community to retrieve the content for presentation by the community customizable screensaver.

15. A community customizable screensaver in a computer-readable medium comprising instructions to cause a processor to:
 to receive personal preferences with respect to screensaver content gathered from a plurality of client devices corresponding to a community of users sharing a community customizable screensaver;
 to instruct one or more of the plurality of client devices of the community to retrieve, from a content provider computer, content of the community customizable screensaver corresponding to the personal preferences received from the plurality of client devices corresponding to the community of users; and
 to present the retrieved community customizable screensaver content.

16. An Internet-based computer network comprising:
 a plurality of computers to provide one or more items of content;
 a server computer configured to:
  determine reference information to provide access to content items; and
  group the reference information into one or more collections;
  receive user preferences from a Plurality of client computers forming a community of users;
  identify one or more collections of interest to each user based on the user preferences; and
  to transmit the reference information for the one or more identified collections; and
 each client computer in the community including a screensaver configured to:
  receive the reference information corresponding to one or more identified collections from the server;
  access one or more of the content items specified by the reference information; and
  present one or more of accessed content items.

17. The network of claim 16, wherein the server is configured to:
 perform a search of one or more of the plurality of content providers based on criteria associated with a user preference received by the server;
 determine reference information for content items that meet the criteria; and
 add the determined reference information for the content items that meet the criteria to a user collection.

18. The network of claim 17, wherein the server is configured to:
 perform a search of one or more of the plurality of content providers based on criteria associated with a user preference;
 determine reference information for content items that meet the criteria; and
 create a collection of the determined reference information for the content items that meet the criteria.

19. An Internet-based computer network comprising:
 a plurality of computers to provide content;
 a plurality of client computers, each client computer including a screensaver and having an associated user, the client computer configured to transmit user preferences associated with each user; and
 a server computer configured to:
  receive user preferences;
  determine reference information associated with the user preferences to provide access to content at one or more of the plurality of content computers; and
  group the reference information into collections associated with each user:
  transmit the user collections associated with each user to each client computer, wherein
 the screensaver of the one or more client computers is configured to:
  receive the user collection;
  process the user collection to obtain the reference information;
  access the content specified by the reference information; and
  present one or more items of accessed content.

20. The network of claim 19 wherein the server is configured to receive a preference of a first user, associate the first user's preference with content associated with a collection of a second user, wherein a change to the content of the second user collection is automatically reflected in the reference information transmitted to, received by, and presented by the screen saver associated with the first user.

21. A computer network comprising:
  a plurality of computers to provide one or more items of content;
  a server computer including:
    an art collector configured to:
      determine reference information that provides access to the content items from the plurality of computers; and
      group the reference information into two or more collections;
    a preference engine configured to:
      receive user preferences for content from a plurality of client computers forming a community of users; and
      identify one or more of the collections of interest to each user based on the user preferences; and
  each client computer in the community including a screen saver configured to:
    establish a first connection with the server to provide the user preferences to the server and to receive the reference information corresponding to one or more identified collections;
    establish a second connection with one or more of the plurality of the content providers to access the content specified by the reference information in the one or more identified collections; and
    present one or more content items from the accessed content.

22. An Internet-based computer network comprising:
  one or more content provider computers;
  a plurality of client computers, each client computer including a screensaver having an associated user, configured to gather and transmit user preferences for content presented by the screensaver; and
  a server computer including:
    a personalized sharing engine to receive and store the user preferences and to share the user preferences between users, and
    an art collector to determine information that references a location of content from the one or more content provider computers corresponding to the user preferences and to provide the determined reference information to one or more of the client computers to facilitate access by the screensaver of the client computer to the content corresponding to the personal preferences at the determined location of the one or more content providers.

23. The network of claim 22, wherein the personalized sharing engine includes a plurality of collections, each collection corresponding to a user and storing the preferences for that user including indications of content presented to each user by the screensavers.

24. The network of claim 23, wherein two or more users form a community of users sharing a common screensaver and a change to the user preferences of a collection of one user in the community automatically causes a corresponding change to the user preferences of all the collections of the users in the community.

* * * * *